(12) United States Patent
Guttag et al.

(10) Patent No.: US 8,605,015 B2
(45) Date of Patent: Dec. 10, 2013

(54) SPATIAL LIGHT MODULATOR WITH MASKING-COMPARATORS

(75) Inventors: Karl Marion Guttag, Plano, TX (US); Craig Michael Waller, Dallas, TX (US); Joshua Abraham Lund, Dallas, TX (US); Andrew Ian Russell, Plano, TX (US)

(73) Assignee: Syndiant, Inc., Dallas, TX (US)

( * ) Notice: Subject to any disclaimer, the term of this patent is extended or adjusted under 35 U.S.C. 154(b) by 199 days.

(21) Appl. No.: 12/975,757

(22) Filed: Dec. 22, 2010

(65) Prior Publication Data

US 2011/0150501 A1 Jun. 23, 2011

Related U.S. Application Data

(60) Provisional application No. 61/289,622, filed on Dec. 23, 2009.

(51) Int. Cl.
*G09G 3/34* (2006.01)

(52) U.S. Cl.
USPC .............................................. 345/84; 345/87

(58) Field of Classification Search
USPC ..................................................... 345/84–87
See application file for complete search history.

(56) References Cited

U.S. PATENT DOCUMENTS

| 5,448,314 A | 9/1995 | Heimbuch et al. |
| 5,596,763 A | 1/1997 | Guttag et al. |
| 5,670,977 A * | 9/1997 | Chiu et al. ...................... 345/85 |
| 5,682,174 A * | 10/1997 | Chiu .............................. 345/84 |
| 7,071,908 B2 | 7/2006 | Guttag et al. |
| 7,113,195 B2 | 9/2006 | Willis et al. |
| 7,283,105 B2 | 10/2007 | Dallas et al. |
| 7,317,464 B2 | 1/2008 | Willis |
| 8,154,474 B2 * | 4/2012 | Ishii et al. ....................... 345/32 |
| 2003/0160803 A1 | 8/2003 | Willis |
| 2004/0179155 A1 | 9/2004 | Huang et al. |
| 2004/0233150 A1 | 11/2004 | Guttag et al. |
| 2006/0268022 A1 | 11/2006 | Guttag |
| 2007/0097047 A1 | 5/2007 | Guttag |
| 2007/0120787 A1 | 5/2007 | Guttag |
| 2007/0132679 A1 | 6/2007 | Guttag |

OTHER PUBLICATIONS

Extended European Search Report issued in correspondence European Application No. 10840145.6 on Oct. 25, 2013.

* cited by examiner

*Primary Examiner* — Amare Mengistu
*Assistant Examiner* — Premal Patel
(74) *Attorney, Agent, or Firm* — Alchemy-Partners, PC

(57) ABSTRACT

Described is a device comprising a spatial light modulator comprising a plurality of comparators for computing a respective drive for each pixel of a plurality of pixels.

18 Claims, 17 Drawing Sheets

Butterflied PPE and ERAM

SPATIAL LIGHT MODULATOR WITH MASKING-COMPARATORS

CROSS-REFERENCE TO RELATED APPLICATIONS

This application claims benefit of priority to U.S. Provisional Patent Application No. 61/289,522 to Guttag et al., entitled "SPATIAL LIGHT MODULATOR WITH CONDITIONAL PARALLEL PROCESSING," filed Dec. 23, 2009, which is incorporated herein by reference in its entirety.

BACKGROUND

1. Field of the Invention

The present invention relates to digital backplanes and various methods, systems and devices for controlling a digital backplane, light modulating elements and spatial light modulators.

2. Related Art

Display systems using microdisplay spatial light modulators (SLM) with solid-state illumination such as LEDs and lasers are used in many products today, but they have limitations in brightness and power efficiency. The brightness of the projectors with a given light source is also limited by the total amount of light-on time (time that the light sources can be turned on) that the SLMs allow.

SUMMARY

According to a first broad aspect of the present invention, there is provided a device comprising: a spatial light modulator comprising a plurality of masking-processors for computing a respective drive for each pixel of a plurality of pixels on the spatial light modulator, wherein each masking-processor comprises logic circuitry for logically and/or arithmetically comparing one or more multiple-bit pixel control values to one or more multiple-bit match values.

According to a second broad aspect of the present invention, there is provided a device comprising: a spatial light modulator comprising a plurality of processing elements for computing a respective drive waveform for each respective pixel of a plurality of pixels on the spatial light modulator, and a command sequencer for generating a sequence of one or more programmable match values, wherein each processing element of the plurality of processing elements comprises logic circuitry for logically and/or arithmetically comparing one or more multiple-bit pixel control values for a respective pixel of the plurality of pixels to the one or more programmable match values for the respective pixel.

According to a third broad aspect of the present invention, there is provided a device comprising: a spatial light modulator comprising: a plurality of processing elements, a pixel control value storage, and an MRRAM array, wherein the plurality of processing elements, the pixel control value storage and the MRRAM array are arranged in an ERAM-aligned architecture.

According to a fourth broad aspect of the present invention, there is provided a method comprising the following steps: (a) controlling a leading edge of a drive pulse based on a first subset of bits of a pixel control value, and (b) controlling a trailing edge of that drive pulse based on a second subset of bits of the pixel control value to thereby generate a pixel drive waveform on a spatial light modulator that controls a pixel on a spatial light modulator for one multi-primary color, wherein the second subset of bits is different than the first subset of bits.

According to a fifth broad aspect of the present invention, there is provided a method comprising the following steps: (a) controlling a pixel of a spatial light modulator based on a first multiple-bit pixel control value, (b) ignoring one or more first bits of the first multiple-bit pixel control value to thereby form one or more ignored bits, and (c) storing one or more second bits for a second multiple-bit pixel control value in respective storage locations of the one or more ignored bits, wherein the pixel of the spatial light modulator is controlled based on the second multiple-bit control bit control value.

According to a sixth broad aspect of the present invention, there is provided a device comprising: a spatial light modulator, a multiple-bit-wide storage for multiple-bit pixel control values, and a masking-loader for writing a subset of bits within the multiple-bit pixel control values, wherein the multiple-bit pixel control values are used to control pixels on the spatial light modulator.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
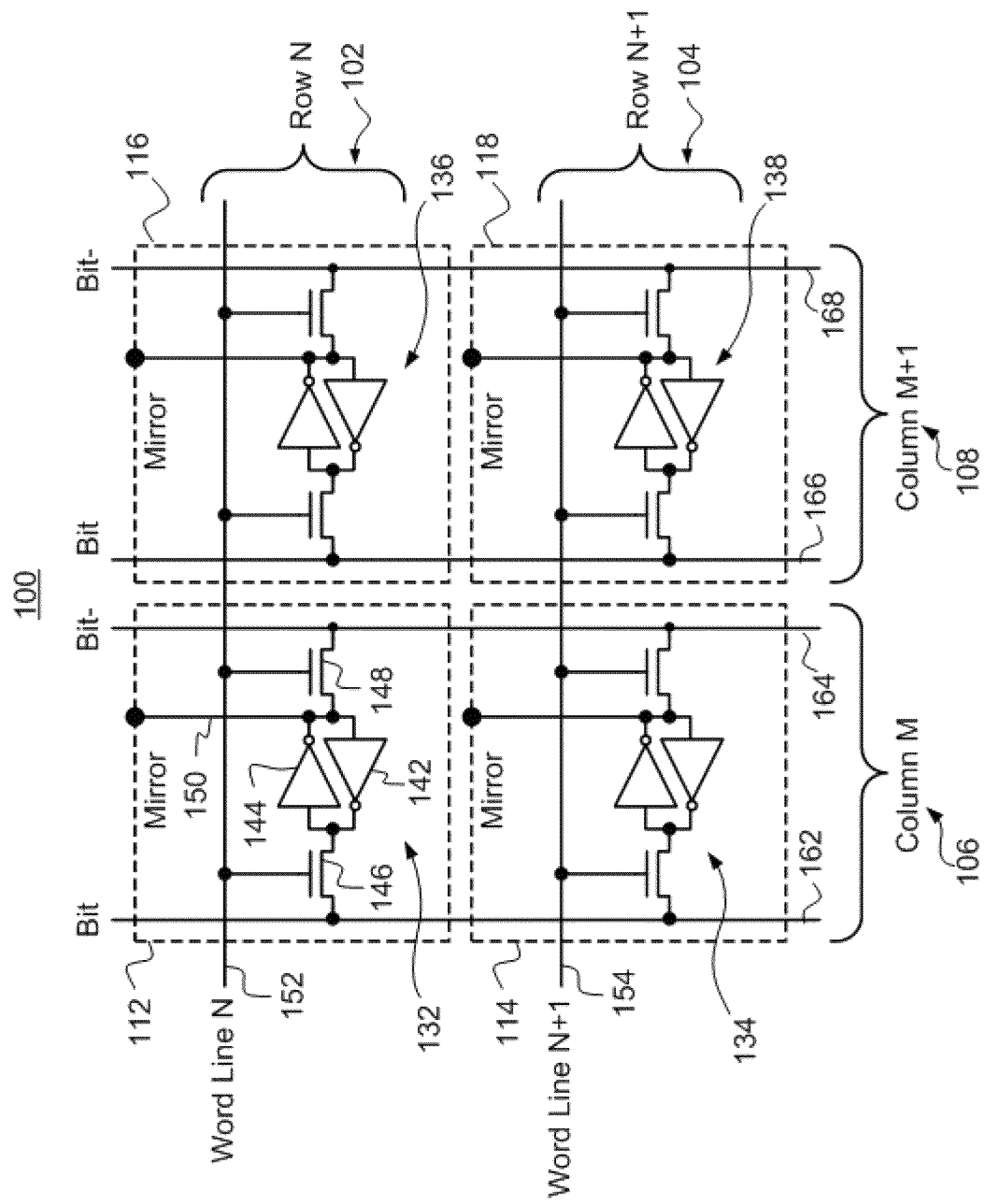
FIG. 1 is schematic diagram of part of an MRRAM.

In the drawings nothing is meant to infer the size or scale of the various features, such as data blocks, relative to each other. Also, it should be noted that in some cases, various systems, processes, circuits, apparatuses, etc. have been shown in simplified form in the drawings to more clearly show particular features in the drawings.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For purposes of the present invention, it should be noted that the singular forms, "a", "an", and "the" include reference to the plural unless the context as herein presented clearly indicates otherwise.

For purposes of the present invention, directional terms such as "top", "bottom", "upper", "lower", "above", "below", "left", "right", "horizontal", "vertical", "up", "down", etc. are merely used for convenience in describing the various embodiments of the present invention. The embodiments of the present invention may be oriented in various ways. For example, the diagrams, apparatuses, etc. shown in the drawing figures may be flipped over, rotated in any direction, reversed, etc.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "1-of-N decoder" refers to the conventional meaning of the term 1-of-N decoder, i.e., a device/chip that takes an encoded bit pattern as input and activates one out of N possible outputs.

For purposes of the present invention, the term "array" refers to a 1-dimensional or 2-dimensional set of elements where each element has one or more bits of data. The array elements or even the bits within elements may or may not be stored physically next to each other. While a 2-dimensional array may imply some physical relationship in a 2-dimensional image or the like, it does not imply that the elements/bits are stored in a 2-dimensional array or, if they are stored in a 2-dimensional array, the physical array and the conceptual array have the same dimensions. For example an 2-dimensional (conceptual) image may be stored in a 1-dimensional physical memory array. Similarly a 1-dimensional conceptual array may be stored in a 2-dimensional physical memory array.

For purposes of the present invention, the term "available memory" refers to memory on a device that is not currently needed by some other process performed by the device.

For purposes of the present invention, the term "backplane" refers to a substrate that is used to build logic and control functions for an SLM. A backplane may be made of a semiconductor material, such as silicon, GaAs, etc. and it would include transistors that are deposited or grown on a substrate, such as the formation of transistors on a glass or other insulating substrate.

For purposes of the present invention, the term "bit plane buffer" refers to storing all or part of a bit plane in a physical memory location. A bit plane buffer may or may not store the bit plane in the same array order as it is seen in a visual display. In some embodiments of the present invention, the ERAM will store one or more bit plane buffers. In some embodiments a series of bit plane buffers may be stored as a series of circular buffers of varying sizes.

For purposes of the present invention, the term "bit plane format" or "planar format" refers to storing pixel data in such a way that one bit from each consecutive pixel of one color are stored or sent together. For example in a planer format, a 32-bit word of pixels would contain 1-bit position from 32 consecutive pixels whereas in packed pixel format, 24 bits would have all the bits for 8 bits per color of red, green, and blue. So in planar format, bits from consecutive bits of, say, bit 3 of red would be stored together for easy retrieval.

For purposes of the present invention, the term "bit selective compare" or "BSC" refers to a compare that could have some bits masked from comparison.

For purposes of the present invention, the term "bit-plane" refers to taking one bit position from an array of values to form a bit array that is of the same dimensions as the original array but with only one bit per element of the array. A "bit-plane" may be either physically separated in the case of "bit-plane organized" data, or it may be used to refer to the concept of a bit position within an array of values. A "bit plane" may also be an array of bits that correspond to an array of values, and the bit value may be based on some computation of the original value. A common use of a "bit plane" in graphics is to refer to any array containing one bit position from an array of multiple-bit pixel values, but the array does not have to comprise only pixel values. A "bit plane" refers to all the bits associated with one bit of one color for all the pixels. For the case of 24 bits per pixel, there would be 24 bit planes.

For purposes of the present invention, the term "bit-serial processing" refers to a method where a multi-bit computation is performed as a series of one-bit-wide operations where the result(s) from previous operations may be used as inputs to the next operation. Bit-serial processing may store each bit of precision at a different memory address.

For purposes of the present invention, the term "bit-serial processor" refers to a device that carries out bit-serial processing.

For purposes of the present invention, the term "color channel" will mean the information that defines a single color in an image. For example, the "red color channel" would have bits that define the bits associated with red color. While it is common to have color channels associated with the primary colors of red, green, and blue, a color field or color channel may also refer to a multi-primary color such as cyan, magenta, yellow or white.

For purposes of the present invention, the term "color crosstalk" will refer the case where in a field sequential color system, the drive of a prior color in a sequence has an effect on the next color in a sequence.

For purposes of the present invention, the term "color field" or "field" for short generally refers to the time period in which a single multi-primary color is displayed. For example, in field sequential color, the red field would be the time in and around the red field being displayed. The drive for a given color field may start before a given color illumination starts, but that drive would be associated with that color. There will generally be multiple fields (of different colors and/or the same color) per frame (see frame definition below). When it will not be ambiguous, the term "color field" will also be used to generally refer to information associate with displaying a single color.

For purposes of the present invention, the term "color space" refers to space in the sense of multidimensional vector space formed by taking each color component as one dimension of the space.

For purposes of the present invention, the term "column" is used with respect to a memory array segment organized on bit lines. Often there are two bit lines per "column" of memory. Often there is a column decoder which functions to multiplex a plurality of columns to form a single output.

For purposes of the present invention, the term "command sequencer" refers a set of hardware or a processor that generates a series of control codes, including but not limited to match values for controlling a spatial light modulator.

For purposes of the present invention, the term "comparator" refers to a set of logic or processing that compares two or more numbers either arithmetically or logically to each other. A logical compare is a bit-wise compare of two or more inputs wherein there is no ordering or weighting of the inputs; for example, an equals compare is a logical compare that can be perform by logically ANDing series of XORs. With an arithmetic compare, the bit positions of each input are "weighted" (often given binary weighting) so that the order of the corresponding input bits of each input affects the result of the comparison. Examples of "arithmetic compares" would be "greater than," "less-than," "greater than or equal to," "less than or equal to," "positive," and "negative" among many others. For purposes of the present invention, a "comparator" may be hardware that directly produces a specific comparison, or it could involve, say, an arithmetic or Boolean operation followed by some logic that looks at the result. For example, a comparator may perform a subtraction and then use the sign bit to determine "greater than."

For purposes of the present invention, the term "comparing arithmetically" refers to a comparison that involves a carry ripple or simple carry operation. Greater-than, less-than, and greater-than-or-equal-to are some examples of "arithmetic comparisons."

For purposes of the present invention, the term "comparing logically" refers to an operation that takes two N bit values and inputs and generates one or more bits based on those bits a result of Boolean operations without a carry ripple path. An equal compare commonly comprises an XNOR function between each pair of bits in the input and then an AND of the results of all the XNOR outputs and this is an example of "logical compare."

For purposes of the present invention, the term "current color field" will mean the color that is currently being displayed by a field sequential color display device.

For purposes of the present invention, the term "display" refers to either to the array of light modulating elements of the SLM that generates an image or, depending on the context, the image itself.

For purposes of the present invention, the term "display panel" or "panel" refers to a device that is a spatial light modulator or SLM. A display panel is a spatial light modulator and may be used synonymously with "spatial light modular" or "SLM" for purposes of the present invention.

For purposes of the present invention, the term "don't care" refers to one or more bits of input for a logic function that do not affect the output of the logic function.

For purposes of the present invention, the term "double frame buffer" will mean that at least part of two different frames/images are stored in a memory or region of memory at the same time. The data stored may be compressed/sub-sampled or uncompressed versions of the original image.

For purposes of the present invention, the term "drive waveform" or "pixel drive waveform" refers a digital or analog signal that changes with time and controls the light output of a pixel within a displayed image. In some embodiments, the drive waveform may consist of a single pulse or multiple pulses. Each pulse having a "leading edge" or "pulse start" and a "trailing edge" or "pulse end." The leading edge of a single pulse occurs first and the trailing edge occurs second. Pulses can be "positive" or "negative" so that the leading edge could be rising or falling and the corresponding trailing edge could be falling or rising. The time between the "leading edge" and "falling edge" of a pulse is its "pulse width." The terms "on" and "off" with respect to a "drive waveform" are purely relative but we will generally refer to "on" meaning that the drive will cause the light output to increase and "off" causes the light output to decrease. Drive waveforms can also be "subtractive" that the drive waveform causes a reduction in light.

For purposes of the present invention, the term "driving an electrode" refers to driving an electrode either directly or through other circuitry. The circuitry used in driving an electrode may include logic functions.

For purposes of the present invention, the term "ERAM" or "execution RAM" or "execution memory" refers to an array of memory bits that are on the spatial light modulator backplane that are at least in part used to compute the output of the backplane. The bits may also be used for other purposes as well. ERAM supports read and write operations like a normal RAM but may have special features to facility display control. Depending on the context, the word "ERAM" can refer to the entire ERAM or to some subset of ERAM bits in the same way the work RAM can be used.

For purposes of the present invention, the term "ERAM group" refers to a group of ERAM bits that share common addressing hardware which may include address decoding, word lines, and other control signals. An ERAM group may include multiple ERAM sub-arrays.

For purposes of the present invention, the term "ERAM sub-array" refers to a group of ERAM bits associated with a given processing element or group of processing elements.

For purposes of the present invention, the term "ERAM with processing element" or "EPE" refers to a module that has an ERAM sub-array and the bit-processing capabilities of a PE or PPE.

For purposes of the present invention, the term "ERAM-aligned architecture" or "ERAM alignment" refers to an SLM architecture where the processing logic is optimized to fit the ERAM structure. One or more processors are designed to closely fit the width of one or more ERAM arrays and their associated logic. This is in contrast to the prior art "MRRAM-aligned" architectures, where the processors are designed to fit the width of one or more MRRAM columns.

For purposes of the present invention, the term "field sequential color" refers to the situation where a spatial light modulator is illuminated using a sequence of colored light. This would be the case, for example, if the spatial light modulator is illuminated by a series of flashes from LEDs, lasers, or other colored light sources. Generally, at a minimum there are the color light primaries of red, green, and blue light, but there can additionally be light sources that are a combination of two or more colors by either turning more than one of the light sources on at a time, or by having a different light source, or by using spectral filtering or other means.

For purposes of the present invention, the term "frame" refers to one image in a sequence of images. In the context of field sequential color there will typically be at least one each of the red, green, and blue fields per frame and there may be more fields either repeating some of the primary colors and/or in the case of a multi-primary color system, with other colors such as yellow, cyan, magenta, and/or white.

For purposes of the present invention, the term "frame buffer" will mean a memory or region of memory where at least part of the representation of an image/frame is stored. This representation may be compressed/subsampled or uncompressed. The frame buffer may or may not have the entire image at any one time. The frame buffer may store different aspects of the image for different lengths of time. The frame buffer may be implemented as one or more circular buffers.

For purposes of the present invention, the term "frame rate" in the context of field sequential color refers to the rate at which the entire image may change. Commonly in U.S. standard television progressive scanned video, the frame rate will be about 60 Hz. The "frame time" is one (1) divided by the frame rate (or about 1/60th of a second for U.S. standard television). In the context of field sequential color there will be multiple color fields in one "frame time."

For purposes of the present invention, the term "function generator" refers to a set of hardwired logic or a processor that generates a data output based on a set of control parameters. For example, it could take in binary number and output the log-base-2 output.

For purposes of the present invention, the term "gamma correction" refers to mapping input pixel values to output pixel values. In display devices, it is common to not want a linear change in the input value to have a linear response on the display.

For purposes of the present invention, the term "group of EPEs" is more than one EPE and its associated memory that may share some common logic or driver circuitry. For example, a group of EPEs might share row decode and drivers for the ERAM sub-arrays.

For purposes of the present invention, the term "hardware and/or software" refers to functions that may be performed by digital software, digital hardware, or a combination of both digital hardware and digital software.

For purposes of the present invention, the term "input pixel value" refers the numerical value associated with a pixel before the value is corrected or adjusted to compensate for the various system and device response characteristics.

For purposes of the present invention, the term "light modulating element" refers to an element/device for controlling the properties of a light source. For example, a light modulating element may control a light emitting source such as a phosphor dot, LED, etc., may control the way light is reflected by a mirror device, may control the polarization of light such as in an LCD or LCOS device, etc.

For purposes of the present invention, the term "line" refers to a horizontal or vertical display line of the mirror RAM array. This typically represents an array of pixels in which one dimensions of the array is 1, and the other is the full horizontal or vertical dimension of the mirror RAM array.

For purposes of the present invention, the term "liquid crystal display" or "LCD" refers to the conventional meaning of the term LCD device, such as a large direct view LCD television, as well as to related devices such as liquid crystal on silicon (LCOS) devices.

For purposes of the present invention, the term "logic circuitry" refers to circuitry that performs logical operations or is used to perform logical operations.

For purposes of the present invention, the term "machine-readable medium" refers to any mechanism that stores information in a form accessible by a machine such as a computer, network device, personal digital assistant, manufacturing tool, any device with a set of one or more processors, etc. For example, a machine-readable medium may be a recordable/non-recordable media (e.g., read only memory (ROM), random access memory (RAM), magnetic disk storage media, optical storage media, flash memory devices, etc.), a bar code, an RFID tag, etc.

For purposes of the present invention, the term "masked-write" refers to a write operation in which some bit or group of bits is enabled or disabled from writing based on a separate mask value. In one embodiment of the present invention, the masking is supported on a bit-by-bit basis, but in other embodiments of the present invention a limited combination of bits may be masked. In one embodiment of the present invention, the data written is common broadcasted in some operations and the control of the outputs is based on whether various bits are enabled to be written. This in effect treats the storage bits as a "Set Reset" (SR) flip flop, that may be set, reset, or left unmodified. A masked-write is one way to implement a conditional update. An example of a RAM with masked-write capability in shown in FIG. 9 of U.S. Pat. No. 7,071,908 to Guttag et al., entitled "Digital backplane," issued Jul. 4, 2006, and the entire contents and disclosure of this patent is incorporated herein by reference.

For purposes of the present invention, the term "masking-comparator" refers to arithmetic and/or logical comparison hardware, software or a combination thereof, that compares two or more multiple-bit numbers together and can selectively mask-off/ignore one or more bits of the inputs from affecting the comparison result.

For purposes of the present invention, the term "masking-loader" refers to a set of hardware that supports writing to selected bits within a multiple value in memory. In at least one embodiment of the present invention, the masking-loader combined with the masking-processor facilitates reusing/re-allocating bits within a word of memory; for example it can be used for loading bits for the next color field while other bits within the word are being used for the current color field.

For purposes of the present invention, the term "masking-processor" refers to arithmetic and/or logical hardware, software or a combination thereof, that processes two or more multiple-bit numbers together and can selectively mask-off/ignore one or bits of the inputs from affecting the processing result. An example of a "masking-processor" is one that comprises a "masking-comparator." A "parallel processor" can be "masking-processor."

For purposes of the present invention, the term "masking-writer" refers to a writer that is able to perform masked-writes.

For purposes of the present invention, the term "match stage" or "stage" refers to a write or masked-write to some or all active lines in the MRRAM plus any delay/wait that is specified before the next match stage can start. The number of cycles a match stage takes is a function of the number of bits written to the MRRAM in a cycle, the number of active pixel segments in the display, plus any programmed wait time. In some embodiments, a match stage will write to all the pixel segments of the display, but it is possible that a match stage could write to only a subset of the pixel segments in a given match stage.

For purposes of the present invention, the term "match sub-stage" includes an ERAM read, compare and unconditional or conditional MRRAM write for all or part of a segment of pixels.

For purposes of the present invention, the term "match value" or "MCHV" refers to a multiple-bit quantity that is compared against the pixel control value. The result of this comparison is then used as part of the control for turning a pixel's output on or off, or to leave the pixel's output in its current state. A match value can come from a counter, or it could come from a list of match values, or it may be computed in some other way. A series of match values that are not a simple count may be used to save memory and/or to generate pulses that are not simply a width based on a count. Match values can be arbitrarily programmable, such as would occur from storing in a memory table, or can be computed by one or more function generators. The term "multiple-bit-match value" refers to a match value that is a multiple-bit value/quantity or number.

For purposes of the present invention, the term "memory reallocation" or "reallocation" refers to storing a new value in a given memory location based on no longer needing that memory location for a previous value that was stored at that location. Some embodiments of the present invention support the reallocation of memory in order to require less total memory. In some embodiments of the present invention bits are reallocated within the storage for a multiple-bit value.

For purposes of the present invention, the term "microdisplays" refers to any of a class of display devices that are sufficiently small to require some form of magnification for human viewing for their intended use in a product. Microdisplays are one type of spatial light modulator.

For purposes of the present invention, the term "mirror RAM" or "MRRAM" refers generically to a memory that includes electrodes or other elements that drive a spatial light modulator. An MRRAM is a RAM that comprises "MRRAM bits." Depending on the context, the word "MRRAM" can refer to the entire MRRAM or to some subset of MRRAM bits in the same way the work RAM can be used.

For purposes of the present invention, the term "mirror RAM array" or "MRRAM array" is a collection of MRRAM bits organized into a memory array.

For purposes of the present invention, the term "mirror RAM bit" or "MRRAM bit" refers a storage bit that is used to drive an electrode that controls the output of a spatial light modulator. The MRRAM bit may drive an electrode through additional circuitry, including logic circuitry for inverting the output of the storage bit and/or voltage level shifting so that the electrode is based on the drive output bit.

For purposes of the present invention, the term "mirror RAM-aligned architecture" or "MRRAM-aligned" refers to an SLM architecture where the processing logic and its associated memory are organized to roughly match the columns of the display Mirror RAM. Examples of this column structure display can be seen in U.S. Pat. No. 7,283,105 to Dallas et al., entitled "Microdisplay and interface on single chip," issued Oct. 16, 2007; U.S. Pat. No. 7,113,195 to Willis et al, entitled "Generating pulse width modulated waveforms to digitally drive pixels," issued Sep. 26, 2006; U.S. Pat. No. 7,071,908 to Guttag et al., entitled "Digital backplane," issued Jul. 4, 2006; and U.S. Patent Application No. 2004/0179155 to Willis et al., entitled "LCOS imaging device," published Sep. 16, 2004; the entire contents and disclosures of all of which are incorporated herein by reference.

For purposes of the present invention, the term "multi-primary color" refers to a single color component of a color image or color system. It is a generalization/superset of the term "primary color" that traditionally refers only to red, green or blue. A "multi-primary color" includes the traditional "primary colors" of red, green or blue, and it could also include some other color that is used to make up a color image, such as white, yellow, cyan, magenta, amber, etc. By this definition, the set of possible multi-primary colors is a superset of the traditional primary colors of red, green, and blue. There may also be cases where non-visible colors such as infrared or ultraviolet are treated as multi-primary colors. For purposes of the present invention, the term "primary color" will be synonymous with "multi-primary color," unless specified otherwise.

For purposes of the present invention, the term "pack sequential format" refers to storing or sending pixel data in such a way that all the bits for a series of bits for a single color are available at one time. In color plane format, 32 consecutive bits of memory could contain, say, four (4), 8-bit red values.

For purposes of the present invention, the term "pack sequential format" refers to storing or sending pixel data in such a way that a all the bits for a series of bits for a single color is available at one time. In color plane format 32 consecutive bits of memory could contain say four (4), 8-bit red values.

For purposes of the present invention, the term "packed pixel" or "packed format" refers to a way of storing or sending an "ordered group of bits" wherein all the bits are grouped together. For example, it is common to use 24 bits of data to specify a pixel with 8 bits of data for each of the primary colors of red, green and blue. In a packed pixel representation, all the bits of the entire pixel are sent together or can be read from memory in one or a very few operations.

For purposes of the present invention, the term "parallel processing element" or "PPE" refers to a "processing element" or "PE" that has some hardware that processes multiple-bit values in parallel ("bit parallel processing" as opposed to "bit serial processing") in what is considered a single clock period. Multiple cycle operations may be performed by a "parallel processing element" by doing one or more parallel operations over multiple cycles. In the case of an SLM, each parallel processing element may control a single pixel or more than one pixel with results being produce in one processor clock cycle or multiple processor clock cycles. A "processing element" or "PE" is a superset of the term PPE in that a PE may be either a bit-parallel or a bit-serial processor. For the purposes of the present invention, the terms "PE" and "PPE" will be used synonymously except in cases where it is necessary to specifically discuss bit-serial processing elements.

For purposes of the present invention, the term "parallel processing elements with selective masking" refers to a set of parallel processing elements where each of the processing elements acts as a mask input that causes the processing element to selectively mask (ignore) one or more inputs in computing a result.

For purposes of the present invention, the term "pixel" or "picture element" refers to a single element of a multidimensional display or a multidimensional image. When referring to part of a spatial light modulator, a "pixel" is a physical structure including but not limited to a small mirror in the case of LCOS or a DLP™ device, or it may be a single Light Emitting Diode (LED), or one or more transmissive element that controls light, or even an element of a printout from a printer. The term "pixel" also generally to refers to both a single element of the physical display and as a single element of a conceptual image.

For purposes of the present invention, the term "pixel control value" refers to any value or number which is used to control the output of one or more pixels. A "multiple-bit pixel control value" is a pixel control value that is a multiple-bit value or number.

For purposes of the present invention, the term "pixel control value storage" refers to the storage where one or more pixel control values are stored.

For purposes of the present invention, the term "pixel segment" or "segment" refers to a series of pixels that are either horizontally or vertically adjacent on the display that can be written simultaneously. In some embodiments, the segment may be exactly equal to the number of pixels in a horizontal or vertical line, but it could also be either part of a line or more than the number of pixels in one line.

For purposes of the present invention, the term "pixel value" refers to the numerical value associated with a pixel. When used without a pre-qualifier as "input or output," a pixel value refers to the current value of the pixel. A "pixel value" is a multiple-bit number that controls the light output and/or reflectance and/or polarization change of a pixel. Although generally 3 or more "pixel color values" are contained within a "pixel value," the term "pixel value" may also be used to refer to a "pixel color value" when it will not be ambiguous. In some embodiments, the "pixel value" will be modified to form a "modified pixel value."

For purposes of the present invention, the term "planarization" will refer to the process whereby pixels in "packed pixel format" are converted into "bit plane format." "Planarization hardware" takes in data in packed pixel format and output data in bit plane format.

For purposes of the present invention, the term "plane splitting" or "planarization" refers to the process of taking a series of multi-bit pack data (such as a packed pixel) quantities and splitting off the bits of one or more bit positions and repacking the split-off bits into multi-bit data quantities that only have the bits of one bit position for the series of data quantities. Plane splitting is a way to take "packed pixel" arrays and convert them into "bit plane organized" arrays. Plane splitting may be done on the whole array or on only some subset of the array. Plane splitting is one of many ways in which incoming pixel data may be reformatted (reorganized) for more efficient data processing or display manipulation.

For purposes of the present invention, the term "primary color" or "color" may refer to the usual notion of primary color, that is, one of red, green or blue. However, in systems that treat other colors as independent, such colors may be treated as primary colors for purposes of processing and display. For example, a system may for some reason have two green channels, both of which we would refer to as primary colors. A system may also treat a white, cyan, magenta or yellow channel as a primary color. Taken together, the primary colors plus any other colors processed like primary colors will be referred to as "multi-primary colors". For the purpose of the present invention, there is no difference between the terms "primary colors" and "multi-primary colors." There may also be cases in which non-visible colors such as infrared or ultraviolet are treated as primary colors.

For purposes of the present invention, the term "processing element" or "PE" refers to one of a number processing data paths that can operate at the same time on different data. The term "element" when referring to a processing data path implies that there are multiple and often large numbers of the processors in some way sharing some amount of common control but working on different data. The processing data path can include logical and/or arithmetic processing that produces either a single bit or multiple-bits of results or outputs. Processing may take multiple cycles to produce an output and may produce intermediate results in the process of producing an output(s). In the case of an SLM in which the PEs are used to control the drive waveforms for pixels, i.e., an "SLM parallel processor," the output of each processing element may control a single pixel or more than one pixel with results being produced in one processor clock cycle or multiple processor clock cycles. A PE can take the form of a bit-serial PE that takes multiple cycles to process multiple-bits or a parallel processing element or "PPE" that can compute a result based on multiple-bits in what is considered a "single" cycle. For the purposes of the present invention, the terms "PE" and "PPE" will be used synonymously except in cases in which it is necessary to specifically discuss bit-serial processing elements.

For purposes of the present invention, the term "processing mask," abbreviated "PMSK," is one or more bits that make one or more bit positions from being processed. In the case of an arithmetic or logical comparison, it causes the corresponding bits to be ignored by the comparison.

For purposes of the present invention, the term "programmable match value" is a match value that can be matched to some value other than a simple up or down count. A programmable match value may be from a table or set of addresses in memory, or it may be from one or more function generators, or it may be generated by a computer.

For purposes of the present invention, the term "programmable match value sequencer" refers to is a unit that provides match values as needed, and it may be programmed with a predetermined sequence of values or it may compute these values. A programmable match value sequencer may be capable of providing non-sequential match values or sequential match values as needed.

For purposes of the present invention, the term "raster process" refers to the conventional meaning of the term "raster process," i.e., a process involving a series of steps in which a first line of pixels are processed and then subsequent lines of pixels are processed. Sometimes a raster process will process more than one line in parallel. Sometimes, but not always, a raster process processes lines or rows sequentially from say either top down, bottom up, middle to the outside (in the case of a dual rasters starting in the middle), left to right, right to left or in some other order.

For purposes of the present invention, the term "row" is used with respect to a memory array segment organized on word-lines (WLs). When the term "row" is used with respect to an image, it will mean a line of pixel as would be part of a raster process.

For purposes of the present invention, the term "segment match" refers to one or more ERAM reads of pixel values for one vertical or horizontal segment of pixels and comparing each pixel value to a match value. A segment match may occur in a single cycle or may take multiple cycles. All or part of the bits of the pixel value may be used in the match. A mask may be used to choose which bits in the pixel and mask value are ignored.

For purposes of the present invention, the term "selectively masking one or more bits" means that there is processing hardware that supports masking one or more bits of input and, in doing so, only a subset of the input bits affect the result. For example, if there is an 8 bit-wide equal comparison and 3 of the bits are "masked," then only the 5 bits that are not masked will affect the equals compare. In effect, the masked bits of input become "don't cares" in terms of the result and are ignored.

For purposes of the present invention, the term "series of match stages" refers to a sequence in which multiple match stages are applied one after another. The end result of a series of match stages cause the individual MRRAM bits to apply or not apply a charge to a mirror or electrode that drives a pixel. The result of the changing charge on the mirror/electrodes causes an optical pixel drive waveform that modulates the light for each of the pixels.

For purposes of the present invention, the term "single pulse" refers not only to a single pulse, but to two or more pulses that are sufficiently close together to behave substantially as a signal pulse.

For purposes of the present invention, the term "SLM device" refers to any device that includes an SLM or is an SLM. Examples of SLM devices include visual display devices, SLMs, etc.

For purposes of the present invention, the term "spatial light modulator" or "SLM" refers to a one-, two- or multi-dimensional array of light modulating elements that control or modify incoming or emitted light and the circuitry included to control those elements on a device and all the control circuitry and memory on the device that is performing the spatial light modulation. For example, each element of a spatial light modulator may change the direction of the incoming or emitted light, the intensity of the incoming or emitted light, the polarity of the incoming or emitted light, the wavelength of the incoming or emitted light, the focus of incoming or emitted light, etc. A spatial light modulator is a component in a display system that has an array of light modulating elements.

For purposes of the present invention, the term "storage" or "storage medium" refers to any form of storage that may be used to store bits of information. Examples of storage include both volatile and non-volatile memories such as MRRAM, MRRAM, ERAM, flash memory, floppy disks, Zip™ disks, CD-ROM, CD-R, CD-RW, DVD, DVD-R, hard disks, optical disks, etc.

For purposes of the present invention, the term "subset" refers to the conventional meaning of the term subset including an improper subset which would include all members of the set. For example, a subset of an array of circuits may include some or all of the circuits of the array of circuits.

For purposes of the present invention, the term "time base remapping" refers to using non-binary weighting of the timing control to weight the time of pulse width(s) based on incoming pixel values either instead of or in conjunction with remapping the pixel values from an input pixel values to an output pixel value such as is done with a "gamma table."

For purposes of the present invention, the term "value" refers to a numerical quantity. The quantity may either be a conceptual infinite-precision number, or a member of a finite set of numbers. For example, the pixel value may be an integer in the range 0 to 255 and can be represented in a circuit as 8 bits, but in a mathematical description, the pixel value may be thought of as having arbitrary precision.

For purposes of the present invention, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, cell phone, smartphone, laptop computer, tablet computer, handheld music and/or video player, personal data assistant (PDA), handheld game player, head mounted display, heads-up display (HUD), water screen upon which an image is projected, greeting card upon which an image is projected, cake upon which an image is projected, global positioning system (GPS) receiver, automotive navigation system, dashboard, watch, microwave oven, electronic organ, automated teller machine (ATM), etc.

Description

Incorporated into some spatial light modulator (SLM) display devices is a controller including memory and processing for controlling pulse widths on pixels. Associated with the controller are: (1) a frame buffer that holds pixel data, (2) hardware that converts incoming video data into a form that can be readily processed by the SLM display device, and (3) control logic for the SLM display device. The controller may be physically built on one or more substrates. For example, it may be more cost effective to use a separate DRAM device for the frame buffer. Also, some or all of the control logic may be located on the controller device, the display device or some combination of the controller and the display device. Therefore, the splitting of functional blocks between the controller and the display device may be somewhat arbitrary.

Typical display panel architectures that have on-chip processing capability of multiple bit planes of data have a commonality in that various bit-planes of a specified pixel are loaded into a processing element that may include a comparator or other logic unit to produce displayable actions that are generated on the display pixels. It is further common that the processing elements are vertically aligned in columns above/below the pixels they are intended to influence, as would be their natural location, what for purposes of the present application is defined as a "mirror RAM-aligned architecture". It is also usual that the supporting memory bits that supply data to the processing elements are generally aligned (if not strictly aligned) to the pixel column or columns that they are intended to influence. This can be seen in U.S. Pat. No. 7,283,105 to Dallas et al., entitled "Microdisplay and interface on single chip," issued Oct. 16, 2007; U.S. Pat. No. 7,317,464 to Willis et al., entitled "Pulse width modulated spatial light modulators with offset pulses," issued Jan. 8, 2008; U.S. Pat. No. 7,071,908 to Guttag et al., entitled "Digital backplane," issued Jul. 4, 2006; and U.S. Patent Application No. 2004/0179155 to Willis et al., entitled "LCOS imaging device" published Sep. 16, 2004; the entire contents and disclosures of all of which are incorporated herein by reference.

A counter may be used with a comparator to control pulse widths, and this approach is used in U.S. Pat. No. 7,283,105 to Dallas et al., entitled "Microdisplay and interface on single chip," issued Oct. 16, 2007; U.S. Pat. No. 7,317,464 to Willis et al., entitled "Pulse width modulated spatial light modulators with offset pulses," issued Jan. 8, 2008; and U.S. Patent Application No. 2004/0179155 to Willis et al., entitled "LCOS imaging device" published Sep. 16, 2004; the entire contents and disclosures of all of which are incorporated herein by reference. In contrast, the present invention provides a method that does not perform an unconditional compare to a counter, but rather uses masking-processors that can mask various bits of a pixel control value that compared to a programmable (not sequential) mask value in order to reduce the need for storage on an SLM.

One method employing the concept of pulse width modulation that has been previously described is to compare the pulse width value to a counter. The pulse is initialized to 1 if the pulse width is none/zero (or, alternatively, the pulse is initialed to 1 unconditionally and then quickly set to zero if the value is zero). At some time interval the counter increments by one each time and the comparison is remade. When the value of the pulse width equals the value of the counter, then the pulse is driven low. This method for use in driving pulse widths on pixels is described in U.S. Pat. No. 7,113,195 to Willis et al., entitled "Generating pulse width modulated waveforms to digitally drive pixels," issued Sep. 26, 2006 (Willis et al. '195); and U.S. Pat. No. 7,283,105 to Dallas et al., entitled "Microdisplay and interface on single chip," issued Oct. 16, 2007 (Dallas et al. '105), the entire contents and disclosures of both of which are incorporated herein by reference. It should be noted that both Willis et al. '195 and Dallas et al. '105 perform a full unconditional compare between all bits of the pixel/pulse value and a counter.

U.S. Pat. No. 7,071,908 to Guttag et al., entitled "Digital backplane," issued Jul. 4, 2006 (Guttag et al. '908), shows how pulse widths on a spatial light modulator can be controlled with a series of partial comparisons. Guttag et al. '908 also shows how to do these comparisons with bit-serial processing. In one embodiment, the present invention uses parallel data processing hardware with conditional per-bit masking support to accomplish a similar function.

The present invention relates to a digital backplane and various methods, systems and devices for controlling a digital backplane, light modulating elements and spatial light modulators. Furthermore, the present invention has features that are particularly useful for supporting field sequential color where a single microdisplay controls the pixel intensity for more than one color that illuminates the panel in sequence.

In some embodiments of the present invention, an SLM device has incorporated into it memory and processing for controlling pulse widths for pixel drive waveforms. The controller has associated with it a frame buffer that holds the pixel data, hardware to convert incoming video data into a form that can be readily processed by the SLM device, and a controller for the SLM device. In some embodiments, the controller of the present invention may be physically built on one or more substrates. For example, it may be more cost effective to use a separate DRAM device for the frame buffer. In some embodiments of the present invention, some or all of the control logic may be on either the controller device, the SLM device or some split between them so the splitting of the functional blocks between the controller and the SLM is somewhat arbitrary.

In the prior art, field sequential color systems generally require at least a "double buffer" of the data to be displayed because most common display formats send RGB values of pixels at the same time, and field sequential color systems display only one color at a time and often repeat the same color more than one time per frame of data. While the prior frame is being displayed one color at a time, the next frame is being saved in the frame buffer. Because for higher resolutions it is generally cost and/or size prohibitive to place a double frame-buffer on the display backplane, it is desirable to send to the panel only bits associated with a single field/color at a time.

In some embodiments of the present invention, the buffering/double buffering of data of the incoming images will be held in memory that is separate from the SLM. This allows the large amount of data to be stored in a device technology that is better suited for making large memory arrays. Separating the main/large data buffer from the SLM also supports making a physically small panel device, which is advantageous in supporting small embedded projectors in devices such as mobile/cell phones. Having the main buffer separated from the panel then requires that the data be sent from the main frame buffer to the SLM. Some embodiments of the present invention reduce the bandwidth required to send data from the main frame buffer to the SLM.

With the main frame buffer storing all the pixel information at a location other than on the panel and with field sequential color, the panel will need data associated with the currently being displayed color to be stored on it to control the currently displaying color. Additionally, at some point the panel will need to receive some or all of the data associated with the next color to be displayed before it can start displaying the next color.

One way to support field sequential color with a separate main frame buffer would be to load all the data associated with one color/field during the blanking time. This may require the use of very high speed I/O's and/or may require an increase in the total amount of blanking time and reduce the percentage of light-on time and thus reduce brightness.

An alternate method that may be used to help overcome the possibility that not all bits can be sent during the blanking time is to bring in data before the blanking time begins. Without the concepts of the current invention, this may require additional storage on the SLM device. A brute force approach would be to have a full double buffer for a given color field or a total of 16 bits per pixel to double buffer 8 bits per color field. In this method, the next color to be displayed is loaded into a second buffer while the current color is being displayed using a first buffer. Once the next color starts working out of the second buffer, the first buffer is used to load the data for the following color.

In one embodiment of the present invention, a panel may have one field buffer of memory on the SLM panel. This is equivalent to 8 bits per pixel (8 bits of red, 8 bits of green, 8 bits of blue, or 8 bits of gray/white). In this embodiment, there is just enough storage for a single field buffer of 8 bits per pixel. This single buffer is shared as the color being displayed changes.

In a sequential color display system, the panel is responsible for displaying individual color fields one after the other. The sequential colors at a minimum are the primary colors of red, green and blue or RGB. A white field may be calculated that is a combination of the input RGB so that all three light sources can be turned on at the same time. In this case the sequential colors can be red, green, blue and white (RGBW), but many variations are possible including RGBW with or without subtractive primaries such a yellow, cyan, and magenta or other combinations of the primary colors.

It is often desirable for each color to have a variable amount of "on" time relative to the field sequential time slots. Between each of the field sequential time slots, it is typical to have blanking time. During this time, one form of light is turned off (R, G, B or W), and the panel will reconfigure for the next light source (R, G, B or W).

In one embodiment, the present invention reduces the need for storage on the panel, reduces the amount of bandwidth to the panel, and provides a large percentage of light-on time while at the same time supporting very fine control of pulse width(s) used to control the light output.

In one embodiment, the present invention achieves most/all of the benefits of a full double buffer system, including lower bandwidth and shorter blanking time, while requiring less than a double buffer of a color field's data.

In one embodiment, the present invention provides a method that selective uses some bit and ignores other when comparing a match value to a pixel value to control pulse edges in order to reduce the need for storage on an SLM.

In one embodiment, the present invention provides parallel data processing hardware with conditional per-bit masking support to support controlling edges of pulse widths using different sets of bits within a pixel's value.

In at least one embodiment of the present invention, the electrode may be a mirror that both reflects light and creates an electric field that causes liquid crystal to modify the polarization of polarized light. Using a semiconductor CMOS substrate, such as silicon, GaAs, etc. to control the Liquid Crystal in this way is known as liquid crystal on silicon (LCOS). In other embodiments, this electric field may be used to control a micro-mirror, as in the case of a Texas Instruments DLP™ device.

FIG. 1 shows part of an MRRAM 100 having two (2) rows, i.e., rows 102 and 104, and two (2) columns, i.e., columns 106 and 108. In this example there are four (4) mirror/electrodes, i.e., mirror/electrodes 112, 114, 116, 118 that are driven by four (4) SRAM bits, i.e., SRAM bits 132, 134, 136, and 138, respectively. Each SRAM bit is composed of two (2) inverters, i.e., inverters 142 and 144, and two bit input pass-transistors, input pass-transistors 146 and 148. Each SRAM bit 132, 134, 136, or 138 combined with its respective mirror/electrode 112, 114, 116 or 118 constitutes an MRRAM bit. An output of each inverter 144 for each SRAM bit 132, 134, 136 or 138 of MRRAM 100 connects via a line 150 to a respective mirror/electrode 112, 114, 116 or 118. Each part of MRRAM 100 includes two (2) word lines, i.e., word lines 152 and 154, and four (4) true and false bit lines, i.e., true and false bit lines 162, 164, 166, and 168, just like a common 6-T SRAM.

In addition to normal SRAM operation, the MRRAM in some embodiments can include "masked-writes" as described in U.S. Pat. No. 7,071,908 to Guttag et al., entitled "Digital backplane," issued Jul. 4, 2006 (Guttag et al. '908), and the entire contents and disclosure of this patent is incorporated herein by reference.

There may be additional transistors for voltage "level shifting" hardware to get a different voltage other than the SRAM bit's voltage on the mirror as described in Guttag et al. '908. But, this is only one of many ways to implement a memory bit that may be used as part of an MRRAM bit. Additionally, different display technologies might require both the true and false electrodes.

Figure 2:
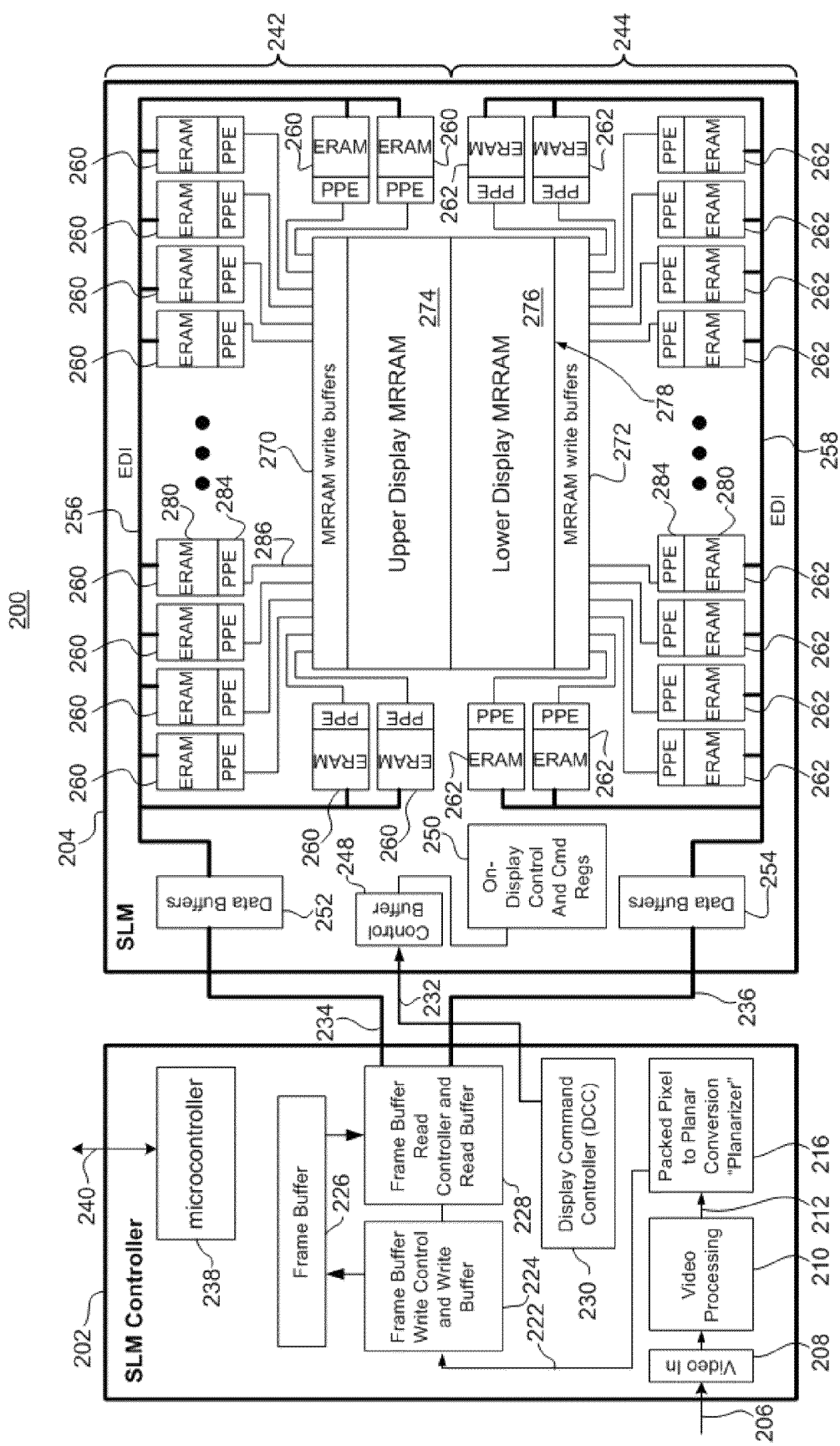
FIG. 2 is a block diagram showing an implementation of a display subsystem that includes a spatial light modulator (SLM) and a controller for the SLM in accordance with one embodiment of the present invention.

FIG. 2 shows one implementation of a display subsystem 200 according to one embodiment of the present invention that includes an SLM controller 202 and an SLM 204. For the embodiment shown in FIG. 2, there is an upper and lower set of data buffers. With the upper/lower split shown, the upper and lower halves of the device can be nearly identical.

Incoming video data 206 may be in any of a number of formats, including but not limited to: digital red, green, and blue (RGB); component video in Y, Cr, Cb format; composite video such as NTSC; cell phone oriented MIPI DSI; television video HDMI; or any other analog or digital video format. Incoming video data 206 may be compressed or uncompressed data. Incoming video data 206 enters SLM controller 202 through video input buffers 208.

Video processing 210 may perform any of a number of video processing and/or enhancement operations. Video processing 210 may include transforming the data in one format or color space into a format for displaying. Video processing 210 may include the decoding of compressed data. Video processing 210 may also include taking, say, red, green, and blue data and generating values for other color fields such as yellow, magenta, cyan, and/or white. Video processing 210 may also include any of a number of adjustments of the incoming video data, such as gamma correction and color adjustment and correction, as well as adjustments related to characteristics of the liquid crystal and/or light sources.

Output 212 of video processing system 210 may be converted from a "packed pixel" representation by bit field planarizer 216 into a "planar" representation where bits are grouped such that there are strings of bits corresponding to one bit-plane of one color packed together. The result of planarizer 216 is sent out on planarizer output data lines 222. It should be noted that while some embodiments of SLM 204 may require this "planarization," it is also possible to provide an SLM, i.e., SLM 204, that can process pixel data and thus obviate the need for bit field planarizer 216. This planarization step on SLM controller 202 supports sending SLM 204 data an order that saves memory on SLM 204 in some embodiments of the present invention.

In the case of field sequential color or in the case where the display rate is different than the incoming video rate, there is a need to store most if not all of the data for an image, a "frame," so the data can be sent to the display at the color field rate. In the case of field sequential color, some or all of the color fields may be displayed more than one per frame. A frame buffer write controller 224 intakes planarizer output data 222 and stores incoming planarizer output data 222 in frame buffer 226. In one embodiment of the present invention, frame buffer 226 has at least enough memory to store two or more complete or partial frames. This type of buffering for frame rate conversion is well understood in the art.

In at least one embodiment of the present invention, a more conventional full double frame buffer is not needed. The frame buffer instead comprises a collection of circular buffers. One circular buffer is used for each bit-plane, or sometimes for subsets of bit-planes. The size of each of these circular buffers may be different depending on how long that particular bit-plane needs to be stored. The size of a particular buffer can be set so that as it is being filled with data from the next frame, the data for the current frame is freed up in time to allow the buffer to not overflow. The data for the current frame can be freed up once that particular bit-plane is transmitted for the last time because the current frame does not need to be stored anymore.

Frame buffer read controller 228 takes data out of the frame buffer 226 and buffers the data to be sent to SLM 204. Frame buffer read controller 228 keeps track of data that is needed from the frame buffer 226 and generates the necessary addresses. Frame buffer read controller 228 may in some embodiments also generate the address of where the data is to be stored on SLM 204, or in other embodiments, the address generation may be done on SLM 204.

Display command controller (DCC) 230 generates display control information that will be used by SLM 204, as will be discussed below. The control information from the DCC 230 may be sent on a separate signal line 232 or may be alternatively sent over data lines/buses 234 and/or 236. Although the signal line 232 in FIG. 2 is shown as a single line for simplicity of illustrations, there may be multiple signal lines 232 from the DCC 230. Frame buffer read controller 228, and/or DCC 230 may in some embodiments generate the address of where the data is to be stored on SLM 204, or in other embodiments, the address generation may be done on SLM 204.

Microcontroller 238 is a programmable microcontroller. It is capable of running programs stored in ROM, Flash, RAM or other memory either inside the microcontroller itself or external to it (not shown). Microcontroller 238 may have various inputs and outputs both from functions within SLM controller 202 and external inputs and outputs via I/O lines 240, as well as analog-to-digital and/or digital-to-analog converters and other functionalities. For example, video processing 210 may collect statistical data on the video data coming in and send that information to microcontroller 238, which in turn may process it to control an external I/O that would affect the drive of an LED. External light sensors could send a signal via I/O lines 240 to the microcontroller 238 and, after processing the signal, in turn could change some parameters that control SLM 204.

In some embodiments of the present invention, depending on the technology available, part or all of various functions of the SLM controller 202 may be implemented on SLM 204. Although SLM controller 202 of FIG. 2 shows only the basic functionality, in some embodiments of the present invention, other functionality may be incorporated onto the controller, including but not limited to digital-to-analog converters, analog-to-digital converters, and voltage-level-changing hardware.

Data lines/buses 234 and 236 are used to send the data that has been read from frame buffer 226 by frame buffer read controller 228 to SLM 204. The display process in display subsystem 200 is split in half into upper half 242 and lower half 244 of SLM 204. A control buffer 248 acts as the interface to bring control information into SLM 204. The control information is sent to the part of on-display controller 250. The type of control information sent is discussed in more detail below. Data lines/buses 234 and 236 connect to data buffers 252 and 254, respectively, in SLM 204. SLM 204 also includes upper and lower ERAM Data In (EDI) lines/buses 256 and 258, respectively; upper and lower ERAM and PPE processing (EPE) modules 260 and 262, respectively; upper and lower MRRAM write buffers 270 and 272, respectively; and upper and lower display pixel mirrors 274 and 276, respectively, of an active display 278. Each EPE module 260 or 262 comprises an ERAM 280 which acts as scratch memory for parallel processing elements (PPE) 284. Signal/control lines 286 connect each EPE module 260 to upper MRRAM write buffer 270 and each EPE module 262 to lower MRRAM write buffer 272. Results from EPE modules 260 are sent to the upper MRRAM write buffers 270, which in turn drive upper display pixel mirror 274. Results from EPE modules 262 are sent to the lower MRRAM write buffers 272, which in turn drive lower MRRAM array 276.

Although in the embodiment of the present invention shown in FIG. 2 various features of the SLM such as the data lines/buses, display pixel mirrors, MRRAM write buffers, etc. are shown as being oriented as upper and lower, other orientations of these features are also possible. For example, these features of the SLM may be oriented as being left and right.

Shown in FIG. 2 is a signal line between each PPE and the upper or lower MRRAM buffers, but this is only for simplicity of illustration. For example, in some embodiments, there may be fewer signal lines that are time multiplexed. As will be explained later, while the drawing shows a single PPE 284 and ERAM 280 group together, in various physical embodiments, multiple PPEs 284 and/or ERAMs 280 can be grouped together. Additionally, while FIG. 2 shows each PPE 284 as having an output signal on signal/control line 286 that goes to MRRAM write buffers 270 and/or 272, in some embodiments as will be described later the results of two or more PPEs 284 may be combined together to form one or more output signals on signal/control line 286.

An example operation of display system 200 will now be explained. Video data 206 enters SLM controller 202, and various types of processing of the data may be optionally performed by video processing 210. This processing may include but is not limited to conversion from one display format to another, decompression if the video data is in a compressed format, color correction, image scaling, generating "white" fields and other multi-primary color fields, and image enhancement.

In the embodiment of the present invention shown in FIG. 2, the output of video processing 210 is in a "packed pixel" format. Bit field planarizer 216 converts packed pixel data into a series of bit-planes wherein multiple-bits for a single bit of a single color are put into groups of bits. It should be noted that in some embodiments, the SLM may be capable of using "pack-pixel" (without being planarized) data, and so the packed pixel to bit field planarizer 216 may not be necessary.

For a field sequential color system, video data 206 is generally received by video processing 210 in a pack-pixel format at the frame rate. Generally this frame of data is coming in at a rate that is slower than the "field rate" in a color sequential display system, and the data is formatted differently than SLM 204 can process to generate a display image. Therefore, frame buffer write control 224 stores the output of bit field planarizer 216 in frame buffer 226. While frame buffer 226 is called a "frame buffer," it may buffer up more or less data than is required for an entire frame.

Frame buffer read controller 228 reads data from frame buffer 226 for sending to SLM 204. In some embodiments it can be advantageous to read the data out of frame buffer 226 in an order that helps reduce the total storage required for ERAMs 280.

DCC 230 generates and sends pixel control codes (PCC) to the on-display controller 250. While a dedicated DCC may be used, the PCCs may be computed by a processor or other device.

DCC 230 also controls the overall coordination and control of the frame buffer write control 224 and frame buffer read control 228. It also can exchange data and control information with other controllers within the SLM controller 202, including but not limited to microcontroller 238, frame buffer write controller 224, and frame buffer read controller 228.

Frame buffer read controller 228 has associated with it data buffers that store data from frame buffer 226. Data is sent via data line/bus 234 and data buffers 252 on ERAM on EDI line/bus 256 to EPE modules 260. Data is also sent via data line/bus 236 and buffers 254 on ERAM on EDI line/bus 258 to EPE modules 262. Pixel data information is loaded into ERAM 280 and an associated PPE 284 conducts a series of operations on the data to control the pulse width(s). Each EPE module 260 or 262 or a group of EPE modules 260 or 262 computes results that can be used to turn one or more pixels in one line of active display 278 on or off either conditionally or unconditionally. These results are sent via signal/control lines 286 that connect EPE modules 260 to upper MRRAM write buffers 270 or connect EPE modules 262 to lower MRRAM write buffers 272.

It should be noted that in some embodiments of the present invention, there may be at least one EPE column of pixels for each of the upper half and lower half of the display. In other embodiments there may be more or less EPEs per column of pixels in each half of the display. In some embodiments, the pixels may be processed in blocks, and, therefore, the EPE may be processing multiple pixels within a block. Additionally, in some embodiments the results of multiple PPEs 284 may be combined to produce one or more signal/control lines 286.

In the configuration shown in FIG. 2, MRRAM is split upper and lower, but this is only one of several options, including splitting left and right or not splitting at all. With an upper-lower split, essentially the top and bottom work in parallel but have essentially the same functionality. Similarly, with a left-right split, essentially the left and right work in parallel but have essentially the same functionality. With either type of split, the two halves of the MRRAM may share common control signals or work independently of each other with independent control from the controller. The on-display controller of the SLM may be tightly controlled by the frame buffer wherein the on-display controller is constantly given control information by the frame buffer read controller, or the on-display controller may have more functionality that allows the on-display controller to run largely independently.

Although the frame buffer is shown to be on the same semiconductor substrate as the rest of the controller shown in the embodiment of the present invention shown in FIG. 2, in some embodiments of the present invention it may be more economical to use a separate high-density memory device for the frame buffer.

In some embodiments of the present invention, part or all of various functions of the frame buffer read controller may be implemented on the SLM depending on the technology available. In some embodiments of the present invention, all the control logic other than the frame buffer may be part of the SLM, which would result in there being just a frame buffer RAM and the SLM. In some embodiments, all the control and frame buffer RAM may be integrated into the SLM. It should also be understood that the controller of FIG. 2 shows only the basic functionality, and it is possible to incorporate other functionalities onto the controller.

In some embodiments of the present invention, the MRRAM write buffers may support conditional writing where the signal/control lines 286 act to send what are in effect write enable signals rather than data per se. These mirror RAM buffers may act as described in U.S. Pat. No. 7,071,908 to Guttag et al., entitled "Digital backplane," issued Jul. 4, 2006, the entire contents and disclosure of which is incorporated herein by reference. The MRRAM differs from a common RAM (SRAM, DRAM, or other RAM) in that the output of the RAM directly or indirectly drives a pixel output. In the case of liquid crystal on silicon (LCOS), the pixel output comprises a mirror that acts as an electrode to control liquid crystal.

Also, although in the embodiment of the present invention shown in FIG. 2 the MRRAM is split into two halves/sections, in some embodiments of the present invention the MRRAM may be split into thirds, quarters, etc. either from top to bottom, left to right, or a combination of top to bottom and left to right. For simplicity, the remaining discussion will primarily discuss embodiments in which the MRRAM is either split into two halves top and bottom or not split, but it should be understood that the MRRAM of the present invention may be split into other arrangements and that the processes described below may be adapted to be used with these other arrangements of the MRRAM.

Figure 3:
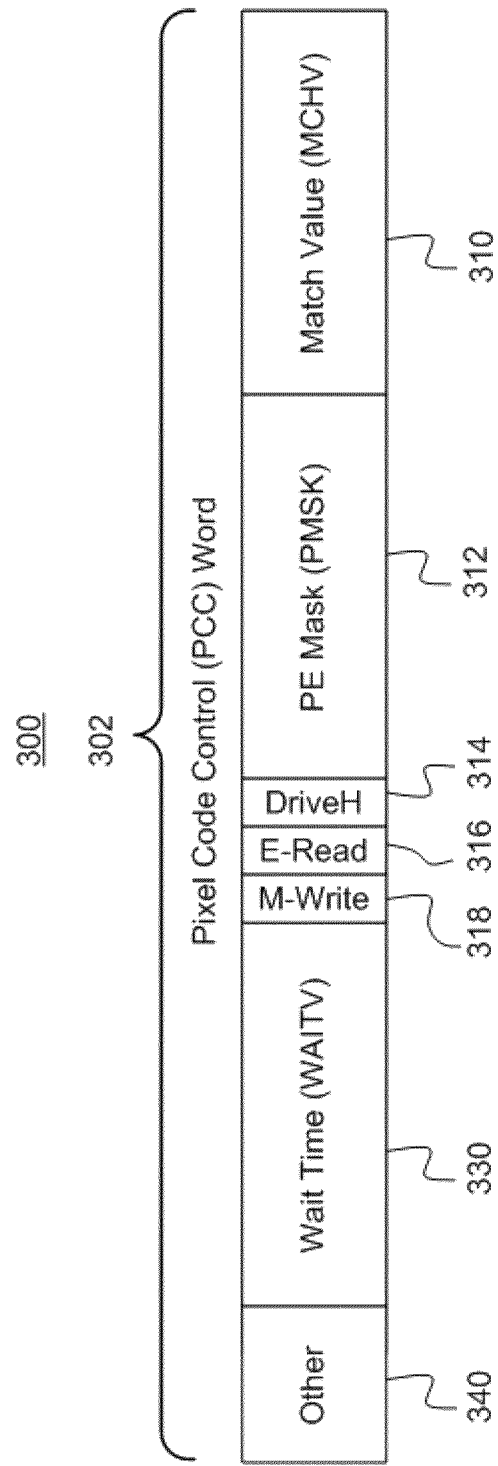
FIG. 3 is a diagram showing a pixel control code word held by a command register in accordance with one embodiment of the present invention.

FIG. 3 shows a command register 300 holding a simple pixel control code (PCC) word 302 according to at least one embodiment of the present invention. It should be understood that this is illustrative of only one possible example of a PCC word 302, and there may be more or fewer fields than shown in FIG. 3. PCC word 302 shown in FIG. 3 includes a match value (MCHV) 310, a PE mask (PMSK) 312, and a drive high signal (DRIVEH) 314 that may be output as control signals by command register 300.

One way of controlling an SLM is to send the SLM control information such as the match value, PE mask, drive high, ERAM-read, and MRRAM-write as control signals to on-display controller 250 of FIG. 2.

Match value 310 is a value used to compare against the pixels. While in some embodiments there may be a single match value 310, in other embodiments there may be more than one match value used to control a pixel. Match value 310 is broadcast to many PPEs to have them compare match value 310 against many pixels at a time and, if there is a match, to control the corresponding pixels.

PE mask (PMSK) 312 supports selectively using only some of the bits in the pixel value and match values in the PPE comparison. The mask is used to selectively ignore some bits when making comparisons. While a single PMSK, i.e., PMSK 312 is shown, for some embodiments it may be desirable to support more than one operation with different PMSK values for each operation.

A feature of the PPE that will be discussed below is that the PPE supports matches between variable numbers of bits. The PMSK may be an encoded value that gets turned into a mask, or it can have an individual bit for every bit position in a pixel value and/or match value.

DRIVEH 314 indicates whether a pixel will be driven high (DRIVEH=1) or low (DRIVEH=0) if a match occurs to a given pixel value and is used to support masked-write operations if they are to be performed. E-READ 316 indicates whether the ERAM needs to be read for the given operation. M-Write 318 indicates whether the MRRAM is to be written to during the given operation.

Liquid crystal displays often require what is known as "DC Balancing." With digital drive of LCOS, there is an ITO electrical coating on the cover glass that forms a field plate. DC balancing may be achieved by inverting the voltage on the ITO and coincidently inverting the voltage on the mirror/electrode for each pixel. The inversion on the pixel can be accomplished by hardware inside the pixel, or it can be accomplished by writing an inverted value to a pixel. Because of this need for DC balancing and ITO changing, DRIVEH signal being a logical 1, would cause the pixel to drive high, or being a logical 0 would cause the pixel to drive low. In some embodiments of the present invention there may be logic that will cause the DRIVEH to be inverted in coordination with the state of the ITO voltage.

Wait time value (WAITV) 330 is a value related to the amount of time to the next command. WAITV 330 may be output by command register 300 to space apart compare operations in time and thus affect the time weighting of a given pulse width. WAITV 330 has enough bits to provide the desired precision of the pulse widths. The wait value is a "differential" timing indicating the amount of time to wait, and this is only one of many ways to specify control timing in the present invention. The wait values can be used to variably/programmably space out the execution of events/controls by the SLM.

PCC word 302 also includes other control bits 340 for other control functions. There may be many other functions or controls as well as multiple match values and multiple PE Mask values, as will be described in more detail below.

There are many equivalent ways to specify the values in the command fields. Putting these values in a single command is just one way to implement the desired functionality.

Figure 4:
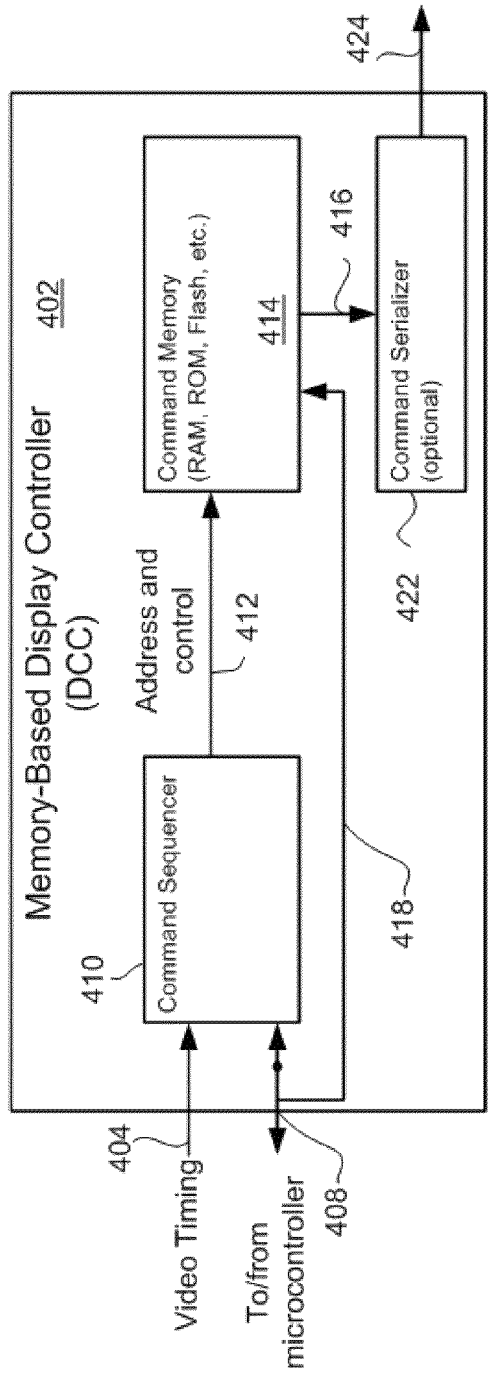
FIG. 4 is a diagram showing the operation of a memory-based display controller in accordance with one embodiment of the present invention.

FIG. 4 shows an example of a memory-based display command controller (DCC) 402 according to one embodiment of the present invention that may be used as DCC 230 of FIG. 2. Memory-based DCC 402 may be used to generate all or some of the control signals of PCC word 302 output by command register 300 of FIG. 3.

In memory-based DCC 402 inputs and outputs, such as video timing on line 404 and microcontroller inputs/output on line 408, send timing and other control information to command sequencer 410. The purpose of DCC 402 is to generate the controls in a sequence that controls the SLM (not shown in FIG. 4). Command sequencer 410 in turn sends addresses and control on a line(s) 412 to a command memory 414 that may be RAM, ROM, flash memory, or some other memory type used to hold programmable control codes that are fetched from said memory and output on signal line(s) 416. Command memory 414 may be loaded directly by the microcontroller via line(s) 418 or indirectly via inputs/output line(s) 408, command sequencer 410 and line(s) 412. The use of a command memory 414 results in very flexible/programmable control codes and the fields within the control codes being output on signal lines 416. The control codes on signal lines 416 along with other information may be optionally serialized by a command serializer 422 and sent out of DCC 402 on line(s) 424.

Figure 5:
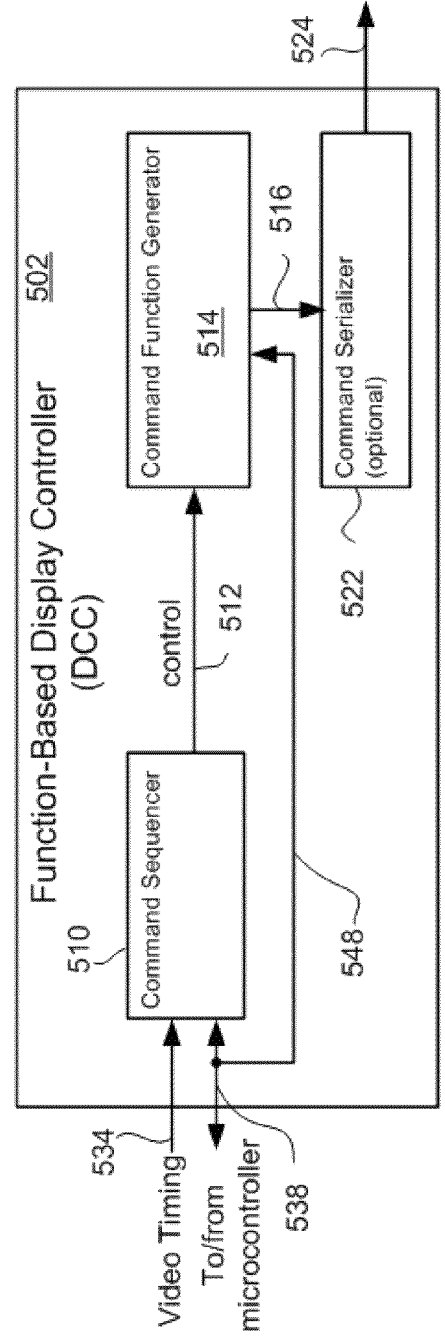
FIG. 5 is a diagram showing the operation of a function-based display controller in accordance with one embodiment of the present invention.

FIG. 5 shows an example of a function-based display command controller (DCC) 502 according to one embodiment of the present invention that may be used as DCC 230 of FIG. 2. Function-based DCC 502 may be used to generate all or some of the control signals output by command register 300 of FIG. 3. Function-based DCC 502 differs slightly from memory-based DCC 402 in that instead of using a loadable memory to generate the control signals output by command register 300, DCC 502 has a command sequencer 510 that generates controls on line(s) 512 to drive a function generator 514. Function generator 514 uses a set of parameters that may be loaded or hardwired to generate control codes on lines 516. The control codes may optionally be serialized by a command serializer 522 or by some other hardware and/or software to be output on lines 524. Inputs and outputs, such as video timing on line 534 and microcontroller inputs/output on line 538, send timing and other control information to command sequencer 510. Function generator 514 may be loaded directly by the microcontroller via line(s) 548 or indirectly via inputs/output line(s) 538, command sequencer 510 and line(s) 512.

DCC 402 and DCC 502 are only examples of implementations of a DCC of the present invention. The functionality shown in FIGS. 4 and 5 may be distributed in various physical places in the system.

A DCC may also have some of the parameters generated by table lookups and other parts generated by function generators. Some parts of the control codes may be used as inputs to the sequencer. For example, the "wait value" may be used to delay the generation of the next control code.

Both DCCs 402 and 502 support generating control codes including but not limited to match values that are not simple counts or fixed values but rather are in some way "programmable."

Figure 6:
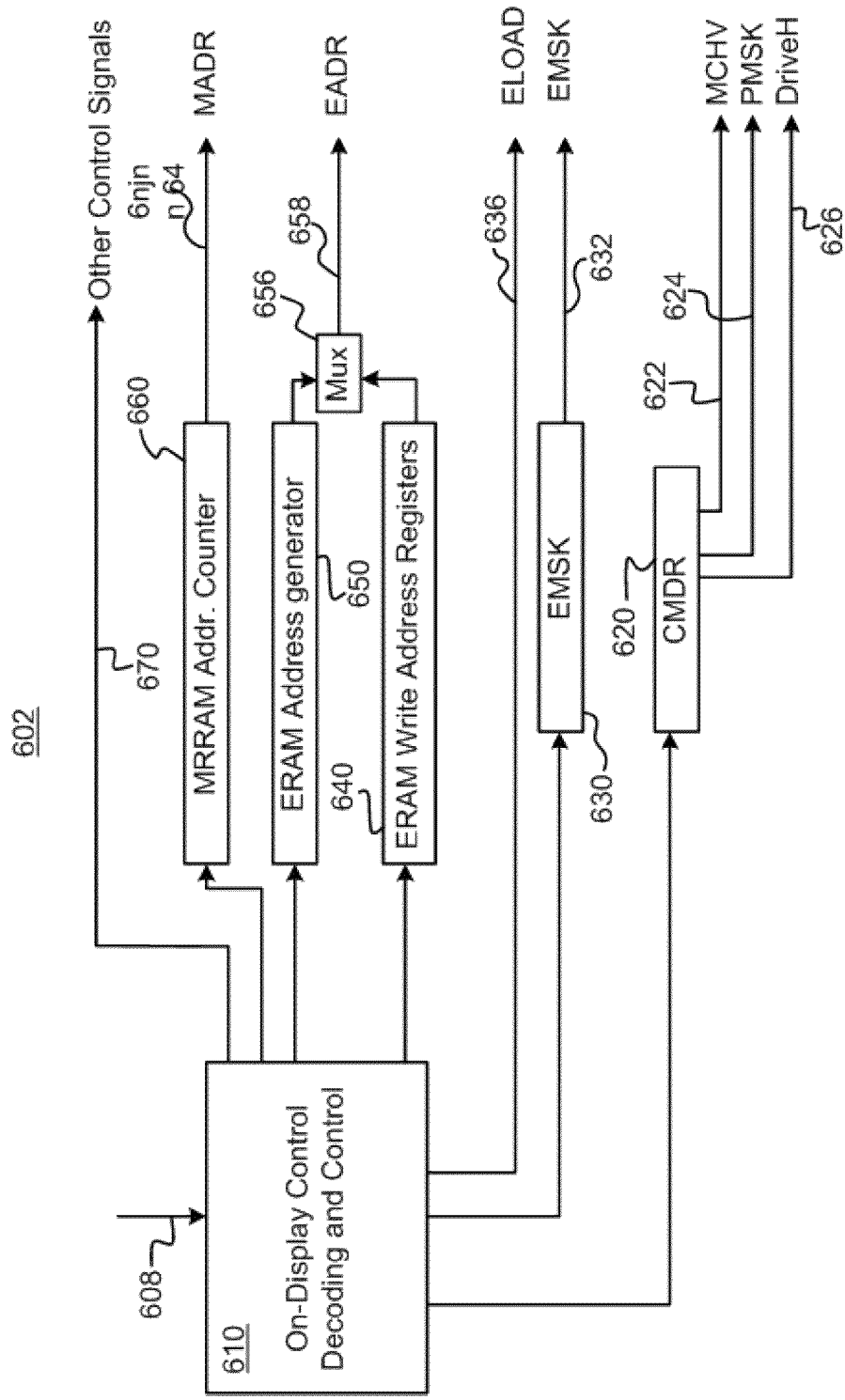
FIG. 6 is a diagram showing an on-display controller in accordance with one embodiment of the present invention.

FIG. 6 shows a more detailed view of the functioning of an on-display controller 602 that may function as on-display controller 250 of FIG. 2. Control information is sent via line(s) 608 to an on-display control decoding, and controller 610 takes the control information, decodes it and uses it to generate controls for the SLM. A command register 620 is sent command information such as one or more match values (MCHV) 622, a PE mask (PMSK) 624, and/or a drive high (DriveH) signal 626.

When writing/loading the ERAM, an ERAM mask value is loaded in emask (EMSK) register 630 that drives an EMSK signal 632. Controller 610 generates an ERAM load control signal 636 at a time when it is appropriate to load ERAM data. ERAM write address register(s) 640 are loaded with the address of where the ERAM data is to be written.

For controlling the display, a series of ERAM addresses are required to provide addresses for the ERAM to provide data for the PPEs. Depending on the processing being done, these addresses may be both for reads and to write back results. Controller 610 sends starting address and control information to an ERAM address generator 650 to generate ERAM addresses. A multiplexer (Mux) 656 supports sending either the ERAM address used for display processing from ERAM address generator 650 or when loading new data from the ERAM write address register(s) 640 to send to an ERAM address (EADR) 658.

Controller 610 controls an MRRAM address counter 660 that generates addresses 664 for the MRRAM. Only a few of the important signals are directly called out in FIG. 6. Additionally there are any number of other control signals 670 that controller 610 may generate for controlling other functions on the SLM.

Figure 7:
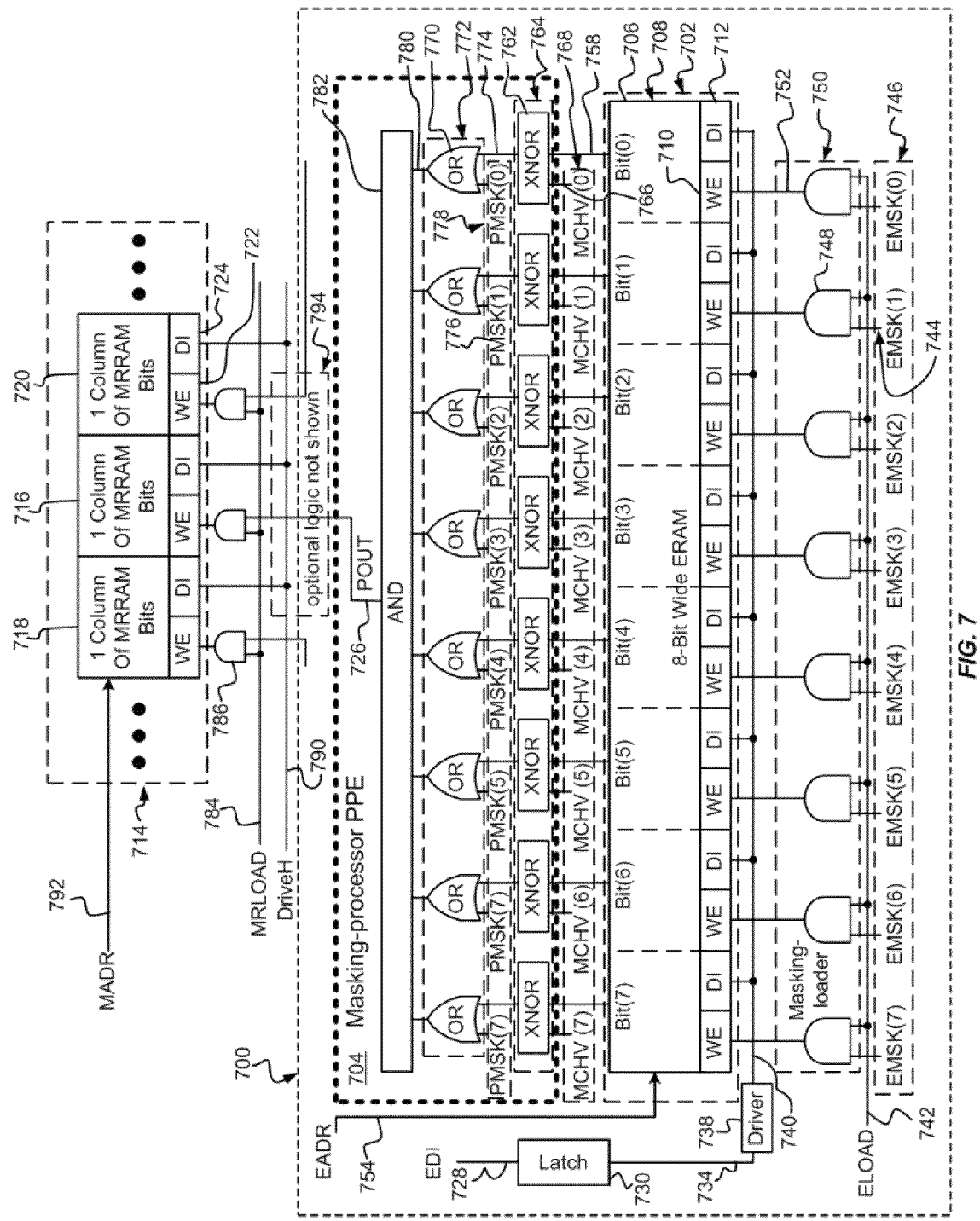
FIG. 7 is a masking-comparator PPE in accordance with one embodiment of the present invention.

FIG. 7 shows a more detailed diagram of part of a single EPE 700 according to one embodiment of the present invention. EPE 700 may be used as a single EPE module 260 or EPE module 262 of FIG. 2. EPE 700 includes an ERAM 702 that serves as the pixel value RAM for a PPE 704. PPE 704 is a "masking-processor" PPE and in this case the "masking-processor" comprises a "masking-comparator." ERAM 702 includes eight (8) bits 706, i.e., Bit (0), Bit (1), Bit (2), Bit (3), Bit (4), Bit (5), Bit (6) and Bit (7), that each have one or more columns of bits 708 a write enable (WE) 710 and a data input (DI) 712. Also shown in FIG. 7 is an MRRAM sub-array 714. One column 716 of MRRAM sub-array 714 is controlled by EPE 700. Three MRRAM columns, i.e., MRRAM columns 716, 718 and 720 of MRRAM sub-array 714, are shown in FIG. 7. Each column, including columns 716, 718 and 720, of MRRAM sub-array 714 includes multiple MRRAM bits and has a write enable (WE) 722 and a data input (DI) 724. A masking-processor output (POUT) controls column 716 of MRRAM sub-array 714. POUT 726 is the output of PPE 704.

Although in the EPE shown in FIG. 7, the masking-processor and PPE are equivalent, in other embodiments, the PPE may contain other hardware that include masking-comparator(s) or other processing hardware.

Although the ERAM sub-array shown in FIG. 7 has eight (8) bits, in other embodiments of the present invention an ERAM sub-array may have more or fewer bits.

A single bit of ERAM data in (EDI) 728 may be selectively stored in latch 730. Latch 730 hold bits waiting to be written into ERAM 702. Output 734 of latch 730 is a bit that will be written to ERAM 702. Output 734 goes to ERAM driver 738 with ERAM driver output 740.

ELOAD signal 742 is used to control when there can be a write to ERAM 702. Eight (8) EMSK signals/lines 744, i.e. EMSK(0), EMSK(1), EMSK(2), EMSK(3), EMSK(4), EMSK(5), EMSK(6), and EMSK(7), from EMSK 746 go to eight (8) respective logical AND gates 748 of AND gate sub-array 750 so that, in combination with ELOAD signal 742, EMSK signals/lines 744 select a given column of ERAM 702 that can be written. Generally only one EMSK signal/line 744 will be active/on at a time, and thus the EMSK value may be from a 1-of-N decoder (not shown). The selection of the 1-of-N active/on EMSK signals/lines 744 may be done locally with only the log base 2 of EMSK signals/lines 744 being routed, or there may be a global decode, or the signals may be global. Outputs 752 of AND gates 748 go to corresponding write enables 710 of each column 708 of bits of ERAM 702. In the embodiment shown in FIG. 7, ERAM driver output 740 goes to data inputs 712 of each column 708 of bits 706 of ERAM. ERAM address (EADR) 754 also goes to ERAM 702 to select a given address in ERAM 702.

If a given write enable 710 is active, then the data value on driver output 740 is written at the address given by EADR 754. The value of EMSK 746 controls which column is written. In normal operation, only one of EMSK signals/lines 744 of EMSK 746 will be active at a time so that only one column is selected.

Although the EMSK in the embodiment shown of FIG. 7 is "decoded," so that only one EMSK signal/line is selected to be active, in other embodiments of the present invention the EMSK may be "encoded" so that more EMSK signals/lines are active. For example, for an ERAM sub-array having eight (8) bits, such as the EMSK shown in FIG. 7, only 3 lines may be used with a local 3 to 8 decode.

In some embodiments, EADR 754 as a RAM address is used for both read and write operations to ERAM 702. If an address is selected, then all columns 708 of bits 706 not doing a write will by default be doing a read. Read outputs 758 of ERAM 702 are sent as inputs to XNOR gates 762 of XNOR gate sub-array 764. There is one XNOR gate 762 for each bit of ERAM output 758. Each match value bit 766 of the 8-bit match value 768, i.e., bits MCHV(0), MCHV(1), MCHV(2), MCHV(3), MCHV(4), MCHV(5), MCHV(6) and MCHV(7) of match value 768, is used as a one bit input to each respective XNOR gate 762. For an XNOR gate, if the two inputs are the same the output will be one, if the two values are different, the output will be zero.

There is one OR gate 770 of OR gate sub-array/masking logic 772 for each bit of XNOR output 774 (which is an input for OR gate 770). Each PMSK bit 776 of the eight (8) PMSK bits, i.e., PMSK(0), PMSK(1), PMSK(2), PMSK(3), PMSK(4), PMSK(5), PMSK(6) and PMSK(7) of PMSK 778, is used as a one bit input to a respective OR gate 770. If the given bit of PMSK 778 is a one, then the output of the respective OR gate will be 1 regardless of the output of the respective XNOR gate 762 received by the respective OR gate, so that PMSK 778 thereby masks the output of the respective XNOR gate. In this way, PMSK 778 may be used to mask each respective XNOR output 774 for each XNOR gate 762 of XNOR gate sub-array 764. Outputs 780 of OR gates 770 are sent as inputs to wide AND gate 782 that performs a logical AND of all outputs 780. If XNOR outputs 774 of XNOR gates 762 went directly to AND gate 782 rather than through OR gates 770, an "equal" comparator would be formed between outputs 758 of ERAM 702 and match value 768. With the logic shown in FIG. 7, the masking-processor PPE 704 performs an "equal compare with masking." Anywhere there is a 1 in the PMSK 778, the corresponding bit output of ERAM 702 will be don't-cares and will not affect masking-processor/PPE output 726.

Although the masking-processor shown in FIG. 7 supports only an exact compare with masking between the bits that are not masked, in some embodiments of the present invention this concept may be extended to masking bits in arithmetic operations such as an addition, greater-than, or less than function. An example of a multiple-bit arithmetic unit capable of selectable bit masking but not used in an SLM is shown in FIG. 21 of U.S. Pat. No. 5,596,763 to Guttag et al., entitled "Three input arithmetic logic unit forming mixed arithmetic and Boolean combinations," issued Jan. 21, 1997, the entire contents and disclosure of which are incorporated herein by reference. Also, while specific combinatorial logic is shown for the PPE of FIG. 7, there are many other ways to produce a logical function to produce a masking or bit-selective comparison. One important feature of a PPE according to the present invention is the ability to mask or ignore one or more inputs.

In the embodiment shown in FIG. 7, the masking-processor output of AND gate 782 is the output of PPE output 726 of PPE 704. Signal MRLOAD 784 is a broadcast/common write signal for controlling MRRAM writes. Each AND gate 786 logically ANDs the common MRLOAD, i.e., MRLOAD 784 with a given PPE output 726 to control write enable input (WE) 722 of a given MRRAM column, which is MRRAM column 716 as shown in FIG. 7. In this way, PPE 704 controls WE 722 for MRRAM column 716.

Signal DRIVEH 790 acts as a common data line for multiple columns of MRRAM sub-array 714 and goes to each data input (DI) 724 of MRRAM column 716. It may be noted that this configuration is somewhat unusual for a memory in that the data lines are common and the write enables are on a per-column basis.

Also shown in FIG. 7 are MRRAM columns 718 and 720 that are immediately to the left and right of MRRAM column 716 to illustrate how DRIVEH 790 is shared between multiple columns of MRRAM sub-array 714. MRRAM address MADR 792 addresses/selects which column of the MRRAM is to be written.

An on-display controller, such as on-display controller 250 of FIG. 2, generates addresses for writing data to ERAMs, such as ERAMs 280 of FIG. 2 or via an EDI, such as EDI line/bus 256 or 258 of FIG. 2. The on-display controller also sends out signals (not shown) that select which ERAMs are to be loaded with a given data item. As an example data lines, such as data lines/buses 234 and 236, may send eight (8) bits per cycle. This data may be buffered for a time in data buffers, such as data buffers 252 and 254 of FIG. 2, and may become wider at a slower rate or narrower at a faster rate to be sent on an EDI bus, such as EDI line/bus 256 or 258 of FIG. 2. If, for example the image is 1280 pixels wide, it takes 1280/8=160 cycles to load one line of data. Assuming the EDI bus is also 8 bits wide, the EDI bus takes take 160 cycles to send a line of data to all the ERAMs and on each cycle 8 bits per top and bottom half of the display would be saved in latch 730 in each EPE. Each latch 730 holds one or more bits of data per EPE waiting for a opportunity to write to its associated ERAM 702.

Although the embodiment of FIG. 7 shows one ELOAD signal, in some embodiments of the present invention there may be multiple ELOAD signals in the SLM to effect a bank arrangement where only some of the ERAMs are written at the same time, which may reduce peak power or reduce the need for buffering on the SLM.

ERAM 702 are written based on signals from EMSK signals/lines 744 that support writing to selected bits 706 of ERAM 702. This arrangement allows writes to occur to some bits in ERAM 702 that are no longer being used due to masking logic 772. This supports the reallocation of a portion of each ERAM 702 to new data being written while other parts of ERAM 702 are being used for processing the current display data. This ability to reallocate parts of ERAM 702 may be used to reduce the total amount of ERAM memory required and/or reduce the peak bandwidth to be sent to the device.

Bits that have been previously loaded into the ERAM are used for controlling pixels. One feature of the present invention is the ability to deal with mix of current bits and bits associated with the next field or fields in the ERAM at the same time. The masking-processor PPEs 704 can select only those bits for the current field while masking (ignoring) bits associated with the next color.

In the simplest embodiment, there is one bit in each ERRAM column for every MRRAM bit MRRAM column. EADR 754 is then used to selects the bits associated with a given pixel driven by a given MRRAM bit.

Although only a few columns of MRRAM are shown in FIG. 7 for simplicity of illustration, in a large display there will be many columns of MRRAM sharing the DRIVEH signal.

FIG. 7 illustrates only the main data processing flow to illustrate the function of the PPE and ERAM and does not show every function that might be implemented. For example there may be additional hardware or logic 794 between the PPE output 726 and write enable (WE) 722 and data input (DI) 724 for MRRAM column 716. Logic 794 may support test functions and the ability to connect PPE output 726 to DI 724 rather than WE 722 to support unconditional writes.

While FIG. 7 shows a logical equal compare, the masking concept of the present invention may be applied to arithmetic compares such as greater than and less than. In other embodiments, such as the embodiments discussed below, PPE masking concepts of FIG. 7 may be extended to arithmetic compares and mixed arithmetic and logical compares.

Although in FIG. 7, an EPE is shown controlling a single column of MRRAM, in other embodiments of the present invention there may be additional logic, such as logic 794, that allows a single EPE to control one or more columns of MRRAM.

The ability to mask the output of individual PPE by the EMSK of the masking-loader of the present invention provides new and improved functionality to an SLM. Providing the ability to mask one or more bits to be processed with a mask such as a PMSK of the present invention provides new and improved functionality to an SLM. The ability to mask the storing to ERAM by an EMSK of the present invention combined with the use of a PMSK of the present invention provide new and improved functionality to an SLM, including but not limited to the ability to more effectively reallocate memory on a bit-by-bit basis.

The ERAM shown in FIG. 7 has eight (8) outputs, and the PPE supports eight (8) inputs, so that the PPE shown in FIG. 7 is 8 bits wide. But, in other embodiments of the present invention, the ERAM and PPE may be some other number of bits in width. The width of the ERAM sub-array and PPE inputs may be any number. In particular, the bit width of the ERAM and PPE may be equal to, more than, or less than the number of bits per color of the output image produced by the SLM. Also, the bit outputs may or may not correspond to a given bit position in a pixel's value. In the case of the Boolean comparison shown, the order of bits is arbitrary, and this can be useful for storing bit positions of pixel values in different locations between color fields.

Assuming there is enough storage on a chip for all of a single multi-primary's bit-planes, a very simple algorithm can be used to produce the pulse width modulation signals necessary for the pixel electrode. In this case, each field can begin with all the pixels being preloaded to the ON polarity if the value is non-zero. On each of the 255 counts, which are appropriately spaced in time to compensate for gamma correction and, in the case of liquid-crystal-based displays, the liquid crystal responsiveness, a comparison is made to determine if the mirror RAM pixel data for that location should be transitioned from 1 to 0. In previous methods, each comparison would need to be an 8 bit unconditional comparison so that each of the 255 possibilities of a pull-down (1 to 0 transition) can be calculated.

In some embodiments of the present invention, a pixel control value will be compared to a "programmable match value" rather than a "count," and the PCC has mask values to support masking of some bits from the comparison. This masking of some bits allows SLMs employing the present invention to more effectively use the available memory in the ERAM, as will be described in further detail below.

As shown in Guttag et al. '908, particularly FIGS. 4 and 5 and their associated descriptions (incorporated herein by reference), pixel pulse widths can be controlled without needing all bits to be used on all comparisons to a "match value." In fact, if a pulse is initially set to 1 and then conditionally set to 0, it can be shown that after half the counts, assuming simple binary counting with the match values, the MS bit is no longer necessary if some redundant sets to 0 can be tolerated.

For example, assuming a simple binary counting method for 8-bit binary pixel values, for the first 127 compares binary 00000001 to 01111111, the entire 8 bits may be used to correctly determine if a pixel should be turned OFF. However, once count 127 (binary 01111111) is reached, it is known that all future counts from binary 10000000 to 11111111 will have a 1 in the most significant bit (MSB) position. Therefore, from count 128 to count 255 the 7 least significant bits (LSBs) (binary positions 6 through 0) may be used exclusively to determine if the pixel output in the Mirror RAM pixel should be switched OFF on a particular count. Furthermore, once count binary 10111111 (count 191) is reached, it is known that all future counts will have a $2^{nd}$ MSB (binary position $6=2^6$) that is high. Therefore, from count 192 to count 255, only the information of the 6 LSBs (5 through 0) is required for turning OFF the mirror RAM pixel. This method may be carried through for the remaining bit positions. Furthermore, this concept can be extended to cases where a series of match values are not the same as a simple binary counting.

Because certain bit positions are no longer needed for comparison, these memory locations are available to be populated with bit-planes of the next field. For example, once count 128 is reached for, say, the multi-primary "red" field, the MSB location in the ERAM (scratch memory) may be replaced with the MSB value for the following green field. This replacement of unnecessary bits may be chosen to fit the needs and time restraints of a particular system. For example one implementation may wait until after count 240 (8-bit binary 11110000) before eliminating the use of any bits and then proceed to perform 4-bit comparisons while simultaneously replacing the 4 MSBs with data for the next field.

As described in U.S. Pat. No. 7,071,908 to Guttag et al., entitled "Digital backplane," issued Jul. 4, 2006, the entire contents and disclosure of which are incorporated herein by reference, eliminating the use of particular bits in a comparison can result in redundant writes to the Mirror RAM. For example, consider a pixel that should be written to a value of 14 (binary 00001110). This pixel will be turned OFF during the 8-bit comparison for count 14, and the pixel will be redundantly turned OFF during the 7-bit comparison for count 142 (binary 10001110), since the 7 bits that are compared at count 142 (binary 10001110) are identical to the value 14 (binary 00001110). If the second MSB was also eliminated from the comparison after count 191, a third write to the mirror RAM will result. This third write will occur at count 206 (binary 11001110). This scenario may be continued through as many bit-planes as desired, in which each bit removed from the comparison can result in an additional write to the mirror RAM. These extra writes may be referred to as "redundant writes." "Bit selective compares," where only some bits are used in the comparison, can take advantage of the fact that there are redundant writes that do not change the pulse width on the mirror-electrode.

This concept of storage freeing up can be extended for comparisons that are not a simple up or down count. The critical requirement is that some of the bits become "don't cares" in the comparison and therefore can be ignored. Once bits are "don't cares" for the remainder of a field, then the storage is in effect free and can be reallocated for loading new data.

In the case of a bit-serial processing, as is discussed in Guttag et al. '908, it is possible skip over bits within bit-planes that are not used at a given time by neither reading the bit from memory nor processing the bit by the associated bit-serial processing. In the case of parallel processing as shown in the embodiment in FIG. 6, the PPEs include selective masking hardware that can ignore various bits, including those bits that may be loaded with data from the next field. In the case of bit-selective compares with masking, the POUT will go to one only when the bits selected for comparison match with the provided MATCH value and MASKING condition. With bit-selective compares, there may be some redundant matches due to the masking. The POUT acts as a control to enable a write to a given MRRAM bit or redundant writes that will either set an MRRAM bit that is already a one to one or already a zero to zero and, therefore, have no effect on the desired output, yet support loading the ERAM with new data.

The display process comprises reading an address location in the ERAM that has a pixel value and comparing that pixel value against a match value. The result of this match results in an output from the PPE that controls a location in the MRRAM. Assuming there are the same number of PPEs as there are columns in the MRRAM, a whole row of pixel values can be compared at the same time, and then a row of bits in the MRRAM can then be controlled.

The MRRAM can be written in a raster process in which the lines are written to in order either from top to bottom or from bottom to top. In the case of an upper-lower split MRRAM as shown in FIG. 1, the raster may go from the center out so that the raster processes for the upper display pixel mirror and lower display pixel mirror start at roughly the same time in the middle of the image. Alternatively, for example, the raster process for the upper display pixel mirror could start writing to the top line first, and then the lower display pixel mirror may wait until the upper array writes its last line and before writing its top line and then doing a raster process from top to bottom. Similarly, if the process proceeds from bottom to top, the upper display pixel mirror may wait until the top line of the lower display pixel mirror is written before performing a raster process from bottom to top. The key here is that generally it is desirable to have a raster process in which the center line writes occur close in time to each other to avoid possible visual artifacts that can occur if lines that are near each other in the image are changed at different times.

Assume the raster process starts on line zero of the MRRAM (assuming binary counters controlling the operation, it is generally best to think of the lines going from 0 to N−1, where N is the number of lines). The raster process will then step from line to line. If there are N lines, it will take N MRRAM writes to write to each half of the display in FIG. 2. In some embodiments of the present invention, two lines or more may be written at a time if the PPE hardware can supply results fast enough either due to, say, parallelism and/or higher speed operation.

For explanation purposes only, assume that the pixel value is being compared to a series of match values that start at zero and increase by one. Additionally, for simplicity of explanation, in this simple example, assume that the number of bits of input into the PPE is equal to the number of bits in the pixel value. Assume that the ERAM for the current field has been loaded for the current field and the pulse width control of the current field is started. And assume the PPE input is 8 bits wide and there are 8 bits per pixel (as has been explained previously, these values do not have to be equal, but it is easier to explain the operation if they are equal).

The first operation is controlled by the command register 620 and other control signals 670 shown in FIG. 6. The command register outputs a Match Value, PMSK, and DRIVEH and the controller outputs other signals such as E-Read, M-Write, and other bits that will be timed by the sequencer and other logic to control each "match stage" of the operation.

For a very simple pulse width, the DRIVEH signal is in a state that will turn the pulse on (which may be a high or low voltage), and then all bits are masked (the value of the PMSK=0) which will cause POUT to be a 1, which will cause the value to DRIVEH to be written to the MRRAM when MRLOAD becomes active. In this case, the pulse is initialized to an "on" state and subsequent compares will turn the pulse off. In some embodiments it may be desirable to put more complex logic in the PPE to perform more than masked equal compares, and for example, the PPE may have additional logic that supports a "not equal" as well as arithmetic greater-than and less-than or similar functions.

Assuming one line/row of the MRRAM can be written at a time, the MRRAM address counter starts at zero and then counts to N−1, with the MRLOAD signal active and the POUT remaining 1. This has the effect, after N cycles, of initializing the entire MRRAM to the DRIVEH value.

The wait time for the current command can then be used to extend time after any given match stage.

For a simple raster, the display control starts with the ERAM address counter outputting an address via the multiplexer to an EADR bus, such as EADR bus 658 (FIG. 6). This address does not have to go in sequential order or start at zero, but for this example, it is easiest to assume that the address is initialized to zero and increments by one after each time it is used. Additionally, for simplicity, in the present example, it will be assumed that the match value (MCHV) will start at zero. As will be explained below, one of the advantages of using a match value over a simple counter comparison is that the match value does not have to start at zero, nor does the match value have to increment or decrement in any particular order, which supports added functionality.

After the MRRAM has been initialized to its starting value, the ERAM starts to read the pixels for line zero. The "zero'th" match-value is then zero, and the PMSK is set to zero to compare all bit locations to see if the pixel value is zero. In the case where the pixel output is supposed to be zero, the output which has been initialized "on" is then turned off. In the case of liquid crystal, if this on then off operation is done rapidly enough, there will be essentially no response by the liquid crystal. Or, alternatively, the comparison to zero stage described below may be an unconditional write to the MRRAM for each row based on a compare of the pixel value to a match value of zero.

The comparison to the zero mask results in the multiple POUTS going to one (1) only if the corresponding pixel values are zero for the pixel values associated with the line pointed to by the EADR. The line pointed to by the EADR will initially be line zero in this example. The POUTS are then sent to their respective columns in the MRRAM. The MRRAM address then also points to line/row zero. Due to delays in the ERAM read, PPE processing, and time to send the POUT signal which may go through latches to route the signals, the write to the MRRAM may be a number of cycles behind the read from the ERAM and, therefore, the MADR may be similarly several cycles behind.

Once the comparison is made for the pixels on line zero, the EADR increments to address the pixels for line one (1), while the match value remains the same. The result of the PPEs is then used to control the MRRAM for line one (1) of the display by having the MRRAM address increment to line 1. This process continues with the match value and mask set to zero until all N lines are similarly processed for the match value of zero. After all lines have been conditionally written to, the pixel values will be either zero if the pixel is off or on, if the pixel value is supposed to be anything other than zero.

The PCC also has a "wait time" field/value, such as wait value 330 (FIG. 3), that is accessed by the DCC and used to control how long it will be until the next change in control values being sent to the SLM 204. The wait timer can be a simple down counter that is loaded with the wait time and then counts down. The wait timer is used to delay the start of the next possible transition of the pulse. In this way, the time period between the various changes can be very flexible. The time steps of the wait timer may be very fine to give fine control of the width of each possible pulse transition.

After the wait timer has counted down, the wait timer signals the display sequencer to load the next command word. The activity associated with controlling all the lines for one match value is a "match stage." In some embodiments, a match stage may comprise modifying only a subset of the lines or segments of lines. A match stage involves stepping through comparing the pixels in all the pixel segments to be processed in a match stage to a match value that may be all or partially masked, and then controlling the pixel values for the corresponding lines or segments of lines. Once all the lines or line segments have been so processed and the wait timer has finished counting down, a single match stage has been completed.

After each match stage, the values in the command register are updated for the next match stage.

The next match stage starts with a new match, mask, and drive values from a command register. In the case of a simple count, the match value will be one (1) and the mask will still be zero, indicating an exact match is being performed. As with the zero'th match stage, the match value will first be compared for the pixel values in the ERAM for line zero and then used to control the MRRAM for line zero. The address into the ERAM is then incremented by one; the comparisons for the pixels on line one are made and then control the pixels in the MRRAM on line one. This process then continues until all N lines have been processed.

Then, a wait delay is applied based on the current wait time in order to get the correct amount of time before starting the next stage's processing. The match value will now be two (2), assuming simple binary counting while the mask remains zero (exact compare) and the whole process repeats itself for every pixel on every line. This process continues with the match value increasing by one for each stage until the match value reaches 128 (8-bit binary 10000000). At this point, match value is 128, but the mask may change to binary 10000000 indicating that the most significant bit is being ignored. This masking does not have to happen precisely at count 128 but could start any time after count 127 is completed. Once a bit is masked, it will typically remain masked through the rest of the current field so that the ERAM bits associated with the masked bits can be used to store other bits. With bits masked in this way, the locations in ERAM may be used for loading new data, including pixel value data, for the next field.

Having bit(s) free during the processing of the current field provides a place to send new bits without double buffering the new bits on the display device. The next opportunity for a bit to free up is after count 191. In this case for count 192 (binary 11000000), the two MS bits can be masked by using the binary mask value 11000000. This process continues with the option to mask bits after count 223, and 239 and so on. It will be noted that the first masked bit may occur approximately halfway through the process, the next one $\frac{3}{4}^{th}$ of the way, the next one $\frac{7}{8}^{th}$ of the way, and so forth, with binary counting match values. Eventually bits may free up, but there may not be enough time to send bits before the end of the active field. So depending on storage and bandwidth, some bits may have to be sent during "blanking," when the bits are no longer being used for counting. In a simple 8-bit counting method, this process continues until all 255 match stages are processed in one simple embodiment.

The use of masks allows memory to be reused/reallocated. The use of masks reduces the need for storage bits and/or data bandwidth between the frame buffer and the SLM without requiring more storage.

While in this relatively simple example, a simple code may be used to mask some number of MS bits, the bit-by-bit masking shown with the ERAM mask and PE mask plus using match values rather than simple counts supports much more flexible methods to allocate/reallocate of memory. For example, some fields may use fewer bits to control the pulse widths compared to other fields. Having bit-by-bit masking allow bit(s) that are not used in one field to be masked for the entire time so that the storage that is not use can be used for bringing in bit(s) of the next field.

With field sequential color, it is common to repeat one or more color multiple times per fields per frame/image in order to reduce what is known as "color breakup" or the "rainbow artifact." When repeating a color field, higher effective color depth can be achieved by not repeating all the least significant counts. For example, if there were, say, two blue fields, one could repeat the most significant bits that affect both fields but then sending only some of the LS bit in the first blue field and the rest of the LS bits in the other blue field by roughly doubling the weighting the time given to the LS bits that occur only once.

Consider, for example, a field that uses 6 bits followed by a field that uses 8 bits with 8 bits of storage per pixel, such as shown in FIG. 7. In this case, all during the 6-bit field, there are two bits that are free for bringing in new bits for use with the next field that will use 8 bits. In the case of field sequential color, it is desirable to repeat the same primary colors multiple times to reduce color breakup artifacts. By not having some of the lesser significant bits used in some of the fields, it will free up storage for other fields that could have more bits. It will be noted that since the bits will be stored in whatever locations are not used, that the position of the bits may move from field to field, and the bits not fixed to a particular order. If a 6-bit field is stored in bit 7 to bit 2 of the ERAM, such as ERAM 702 of FIG. 7, then bit 0 and bit 1 are free for bringing in bits for the next color. If the most significant bits of an 8-bit pixel value are loaded first, the bit 7 of the pixel value could go into bit 1 of the ERAM, and bit 6 of the pixel value may be loaded into bit 0. As the bits free up, then bit 5 of the pixel value would be loaded into bit 7 of the ERAM, and so forth. In the end, the pixel bit ordering and the location of the bits in the ERAM could end up being scrambled. To support this scrambling of the bit order in the ERAM, the corresponding Match Value, PMSK, and EMSK will be similarly reordered. This reordering of the match value, PMSK, and EMSK may be done as part of a stored table in the controller or may be computed algorithmically.

Figure 8:
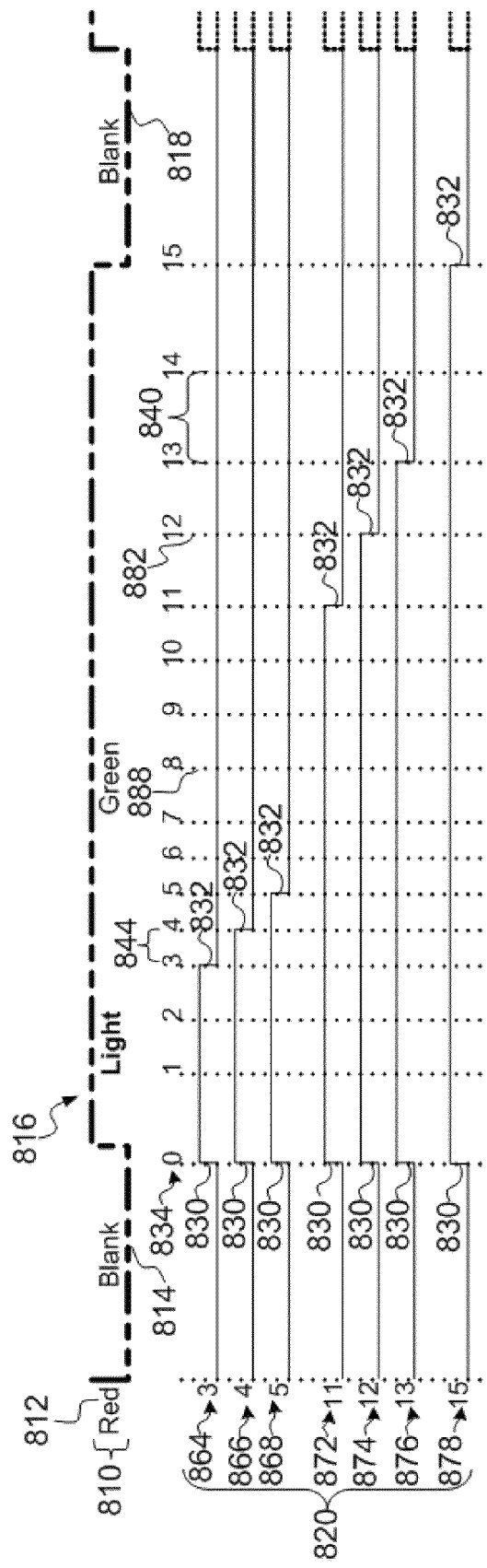
FIG. 8 shows a pixel drive waveform for a drive method in accordance with one embodiment of the present invention.

FIG. 8 shows a set of pulse width pixel drive waveforms according to one embodiment of the present invention employing a single pulse in which the pulse width drive waveforms increase unidirectionally with pixel value. Light waveform timing 810 shows the field sequential light waveform that starts with red light on 812, then a blanking/dark time 814, then green light on 816, then another blanking 818, and which is then followed by another field. A series of drive waveforms 820 have pulse starts or leading edges 830 and pulse ends or trailing edges 832 shown as a result of various pixel values for the green color in this example. Each pulse of the pixel drive waveforms has a single pulse with a leading edge 830 and a trailing edge 832. While the waveforms are shown going "high" on the leading edge and "low" on the trailing edge in what is known as a "positive pulse", may be positive or negative. The "pulse width" is simply the time between the leading edge and trailing edge for a respective pulse. This simplified example is for a 4-bit pixel value with 16 different possible pulse widths (with zero being one of the pulse widths) as indicated by time periods 834 from 0 to 15 that each have individual durations such as length/interval 840, the time interval between pulse 13 and 14, and length/interval 844, the time interval between the end of pulse of width 3 and 4.

Time periods 834 are shown being non-linear in that each time period has a different length. The control of these time periods supports adjusting for the liquid crystal response, gamma correction, and any other correction/adjustment to the input pixel value versus light out response. Control words, such as PCC word 302 of FIG. 3, and their respective WAITVs, such as WAITV 330, may be used to adjust the time periods. Example drive waveforms 820 are shown in FIG. 8 for pixel values of 3, 4, 5, 11, 12, 13, and 15, labeled 864, 866, 868, 872, 874, 876, and 878, respectively. The end of the time period for the value of 12, i.e., time instant 882, and the end of the time interval for the value of 8, i.e., time instant 888, are also called out. In this simple example, at the start of "blanking" after the red light, the pixel is turned off. The leading edge of each pulse occurs at the same time and then ends after a variable amount of time based on the pixel value. The trailing edge of each pulse of the drive waveforms would be controlled by either an exact (logical) match or a perhaps an arithmetic greater-than comparison.

In FIG. 8, each pulse's leading edge occurs at the same time but becomes unidirectionally longer with increasing pixel value. This simple counting can be supported by a simple counter with exact compare or other features of the present invention. While these pulses are shown starting on the left (earlier in time) and growing to the right (later in time), the direction of the growth of the pulse may be reversed so they grow from left to right with greater pulse width.

In some embodiment of the present invention shown in FIG. 8, the trailing edges may be based on a masking-comparison/masking-processing. Specifically after the comparison for the value 7, the bit 3, the MS bit of the 4-bit pixel value can be masked. By masking this bit in all subsequent comparisons, the memory associated with bit 3 in the ERAM can be allocated to loading data for the next field. After the comparison for 11, bit 2 of the 4-bit pixel value can be masked in all subsequent comparisons to support reallocating/reusing the memory associated with bit 2 of the green pixel value. Bit 1 can be freed up with masking-comparison after the comparison for 13, and for bit 0 the LS bit frees up after the comparison for 14.

Looking at the time periods in FIG. 8, and the way in which the various bits free up, it can be seen that each subsequent bit frees up progressively nearer the end of the time before blanking. At some point, there may not be enough time and bandwidth to load the storage for the next given bit-plane before blanking. The remaining bits may be brought in during blanking, and/or there may need to be additional storage so that bits can be brought in before some of the memory frees up.

Figure 9:
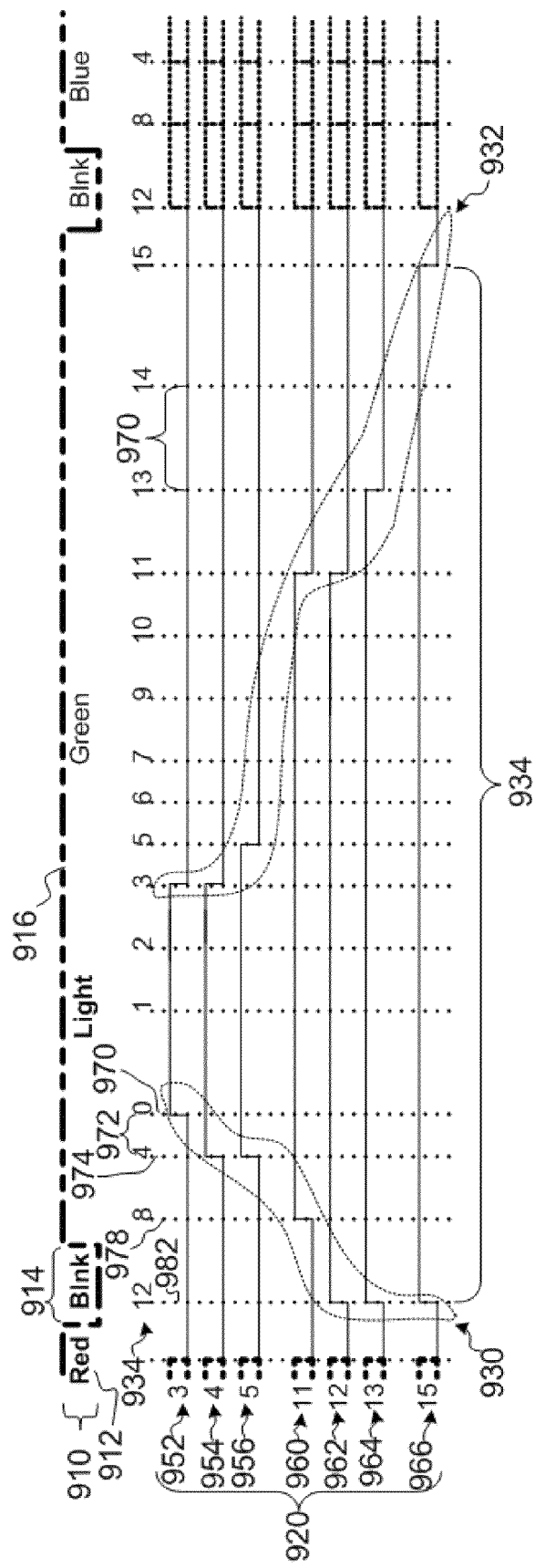
FIG. 9 shows a pixel drive waveform for a drive method in accordance with one embodiment of the present invention.

FIG. 9 shows a set of pixel drive waveforms according to some embodiments of the present invention employing a single pulse in which the pulse width drive waveforms increase in more than one direction with pixel value. Illumination waveform 910 shows a field sequential color illumination similar to FIG. 8. It shows the end of red illumination 912, a smaller blanking period 914 followed by the green illumination. Pixel drive waveforms 920 have leading edges 930 and trailing edges 932 shown. Time periods 934 from 0 to 15 are labeled. Pixel drive waveforms 920 are shown for pixel values of 3, 4, 5, 11, 12, 13 and 15, labeled 952, 954, 956, 960, 962, 964 and 966, respectively, as examples to contrast with those same waveforms 820 of FIG. 8. It should be noted than unlike time periods 834 of FIG. 8, time periods 934 are not in simple sequential order. Because they are not in a simple up or down sequential order the "programmable match values" aspect of this invention are required.

The time intervals between end times 13 and 14, i.e., time interval 970, and 3 and 0 and 4, i.e., time interval 972, are shown. The drive waveforms shown in the example of FIG. 9 is for a 4-bit pixel value with 16 different possible pulse widths (with zero being one of the pulse widths) as indicated by time periods 0 to 15, i.e. time periods 934, that each have a length/interval such as time intervals 970 and 972. As is shown, the drive routine in FIG. 9 supports shorter blanking times, which enables a brighter image due to longer illumination and, as will be shown, this embodiment also reduces the need for storage on the SLM. The time periods are reordered and are, on average, somewhat longer than the time periods in FIG. 8 even though the total time including blanking (which is shorter) is roughly the same. The leading edges 930 of pulses/pulse waveforms 920 in FIG. 9 each start at one of 4 times.

In the example of FIG. 9, the leading edge of the drive waveform occurs based on the two (2) MS bits of the pixel value. With standard binary weighting, each bit position has a value equal to $2^n$, where "n" is the bit position. In this case there are 4 possible starting edges at times 0, 4, 8 and 12, labeled 970, 974, 978 and 982, respectively. The pulses gradually increases from left to right similar to the simple method of FIG. 8 up to a pulse with of 3, but for a pixel value of 4 or greater the pulse leading edge starts earlier. The time interval from 0 to 4, i.e., time interval 972, is the next time period wider, but the pulse is starting earlier at time 974 rather than ending later as was the case in FIG. 8 for waveform 866. In this example 100% of incremental pulse width is added to the starting time. For the waveforms for pixel values 5, labeled 956, and 6 and 7 (not shown), the pulse grows to the right, with the pulse starting at the same time 974.

At pixel value 8, the pulse leading edge starts at time period 978 and then the drive waveforms for pixels values 9 and 10 (not shown) and pixel value 11, labeled 960, start the same as for pixel value 8 at time period 978, but then grow to the right.

With the waveforms for pixel value 12, labeled 962, and above, the pulse once again starts earlier at the time instant indicated with a 12, time instant 982. In this 4-bit example, this is the earliest the pulse will start. The active/drive time then gets longer for pixel values 13, labeled 964, 14 (not shown), and 15, labeled 966.

In the case of the waveform for pixel value 15, labeled 966, the largest possible pixel value for a 4-bit pixel value, it will be noted that the drive pulse ends a small amount of time before the blanking between green and blue. This is done because it will take some time for the LC to respond and even if the LC starts to turn off, there will still be some light output, which will increase brightness.

There are many advantages in supporting the pixel drive routine shown in FIG. 9 which uses match values (and not a simple up and/or down count) over the simpler drive routine which could have been performed using a counter or match values shown FIG. 8. In particular, the drive method shown in FIG. 9 takes advantage of the way bits can free up with the masking-processor support described above. In the case of FIG. 8, all bits have to be known/loaded before the pulse can start, whereas in FIG. 9 only some of the most significant bits, in the case of FIG. 9 only the two (2) MS-bits, need to be loaded, because they are the only ones used in the comparison. Bits that have not been loaded can be ignored by the masking hardware such as the PMSK 778 in FIG. 7. This lets the brightest pulses start sooner and reduces the need for blanking time. In the time where the pulse is starting before time instant 0, the least significant bits can be loaded. It may be desirable to have all the bits need to be loaded by time instant 0 so that if the pixel value is 0, then no (or a very small) pulse is generated. With such a drive there is generally more time in which there is some bit(s) in ERAM that are "free" and thus available for storing bits, and this in turn tends to reduce the need for storage on an SLM and/or bandwidth to the SLM.

FIG. 9 assumes that the number of MS bits used in the variable start remain a constant (in the simple example, 2 MS bits). But assuming that there is still data being loaded during the time that the variable start occurs, it is possible that the precision of the variable start could increase with time. For example, in the case of 8 bits (up to 256 pulse widths), the 5 most significant bits may have been loaded at the beginning which would support 32 ($2^5$=32) start times. But, for example, if after 16 start times there has been another bit loaded, then instead of 16 more variable starts there may be 32 more variable starts. If after 16 of these starts another bit has been loaded then there may be yet another set of additional variable start times. So in this example, starting with 5-MS bits, there may be 16+16+32=64 start times.

Figure 10:
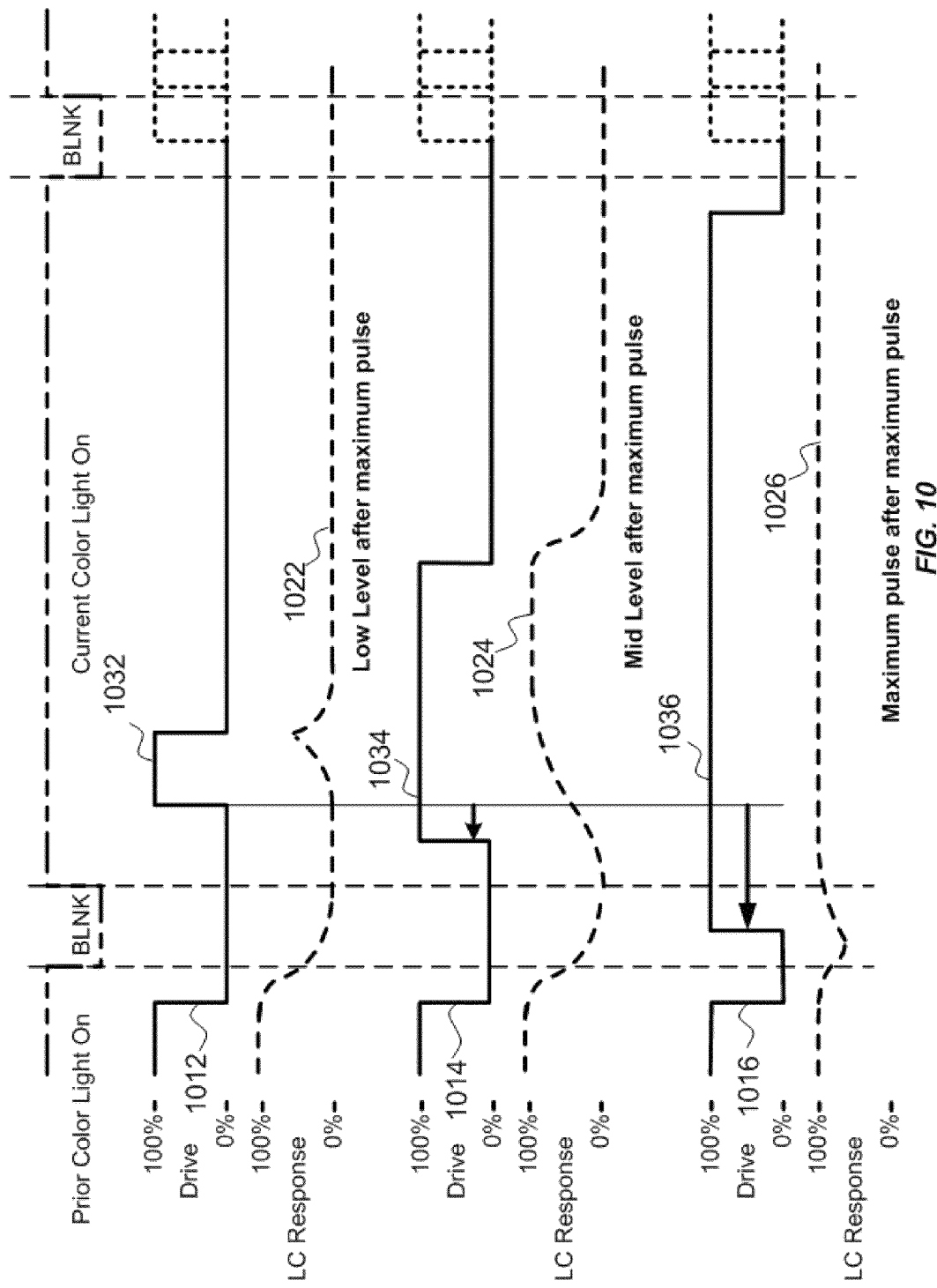
FIG. 10 shows how a drive method in accordance with one embodiment of the present invention operates when the prior color field has a pulse width at or near the maximum pulse width.

FIG. 10 shows the liquid crystal response for an SLM which uses liquid crystal or other slower switching medium with the drive method show in FIG. 9. Shown is the illuminating light waveform along with the pixel drive waveforms (solid lines) and liquid crystal responses (dashed lines). With liquid crystal or other medium that has a response from white to black that is long enough that it will still not be totally off before the next field starts, there may be some cross-talk (the prior color field's response, significantly affecting the next field's response) between the prior color and the next color.

FIG. 10 shows three drive waveforms 1012, 1014 and 1016 with respective light responses 1022, 1024, and 1026, with the prior field ending in a high state to show the possible effect it could have on the next field (color crosstalk). Drive waveform 1012 has a "small" pulse 1032 in the current field. Drive waveform 1014 has a "medium" pulse 1034 in the current field. Drive waveform 1016 has a near maximum (width) pulse 1036. If the prior color's pulse would not be near maximum, then the pulse would have been low at the start of blanking and there would be no possibility of crosstalk. For the small waveforms 1012 and midsized waveforms 1034 due to the variable start, there is good separation and thus very little if any "color crosstalk". But if the current pulse starts earlier, the state of the prior field affects the current field, as shown in drive waveform 1016.

If the prior color is not near its maximum width, then the prior color will turn off early enough that the initial value of the medium will be near zero and there will be no crosstalk between time-adjacent colors.

For maximum brightness as shown in pulse 1036 (drive waveform 1016), the color crosstalk effect can be used beneficially to increases brightness when the display mechanism/medium (such as liquid crystal) has a somewhat slow rise time. Not allowing the medium to become fully off before driving the next current field will cause the LC response 1026 to start higher and thus output more light, because the medium does not have to rise from being nearly off when both colors are bright. Since significant color crosstalk happens only with two adjacent colors both near maximum while their fields affect each other, it causes only a relatively small percentage change in the color even with some crosstalk.

By looking at the colors in video processing 210 of FIG. 2, it is possible to adjust the pixel control values that control the pulse widths to compensate in the event that there is some color crosstalk with bright colors. This method has very little crosstalk when a dark color follows a bright color, so the bright color can still be saturated, yet to allows crosstalk between two bright colors where the crosstalk effect will either be acceptably small on a percentage basis and/or can be corrected with video processing, such as video processing 210 of FIG. 2.

Figure 11:
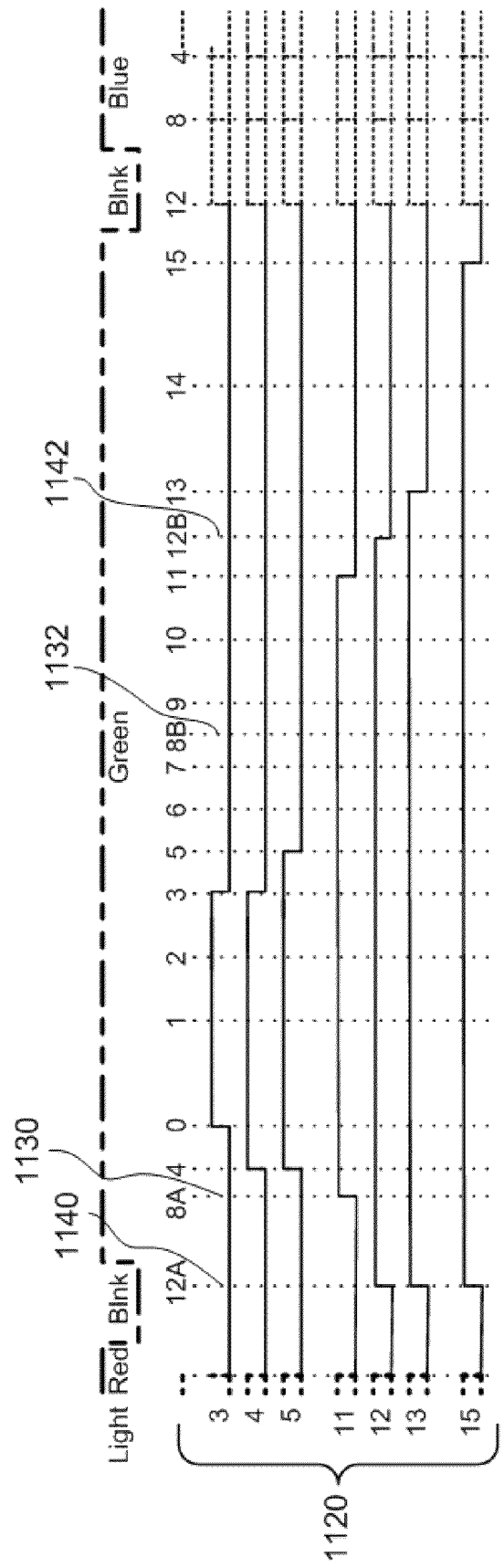
FIG. 11 shows a pixel drive waveform for a drive method in accordance with one embodiment of the present invention.

In FIG. 9, each count increased either the left or right side of the pulses/pulse waveforms 920, but as FIG. 11 shows, it is possible to have some or all of the pulse steps broken up to step on both the left and right side. For example, the step for 8 is broken into a left side edge 8A, i.e., edge 1130 and right side edge 8B, i.e., edge 1132. Similarly, the pulse width for step 12 is broken into respective edges 1140 and 1142. One of the benefits of the present invention's masking-processors and the programmable match values is the ability to add pulse edges that are not related to a single "count." Breaking the edges as shown in FIG. 11 can reduce any jumps in brightness caused by "crosstalk" with the previous color.

Figure 12:
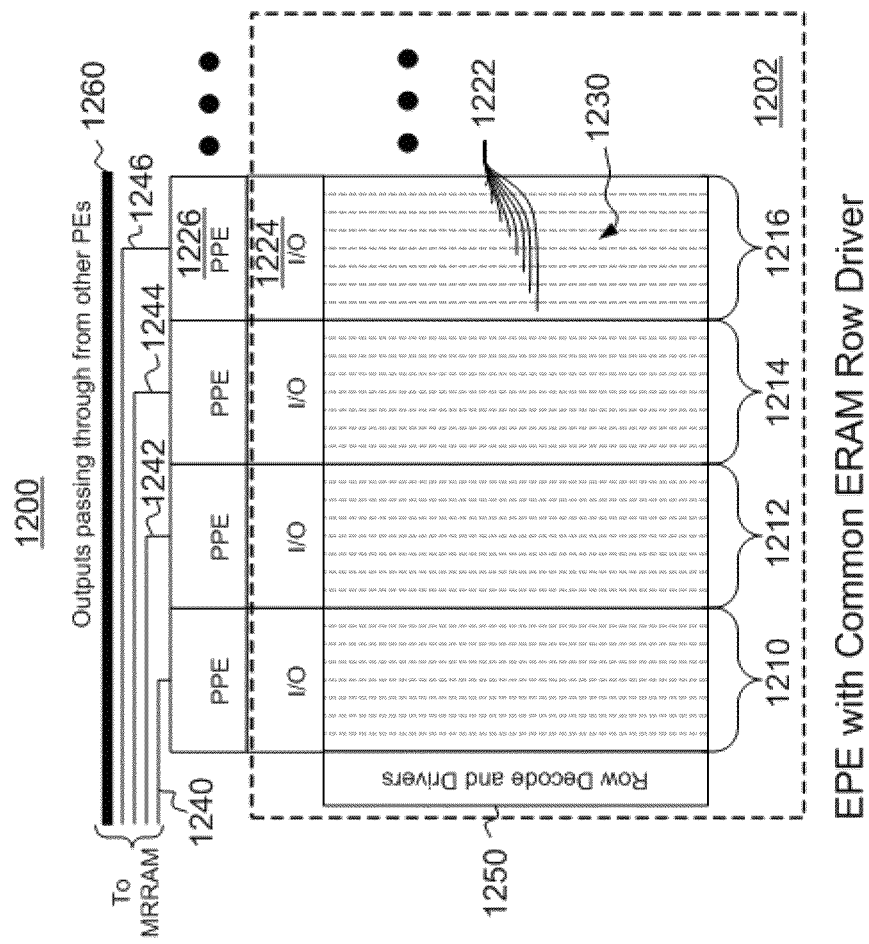
FIG. 12 is a diagram showing how multiple parallel processing elements and ERAM may be configured with a common ERAM row driver wherein the PPEs are aligned to the ERAM (ERAM-aligned architecture)

FIG. 12 shows an example of a group of EPEs 1200 including a group of ERAM 1202 and including four EPEs 1210, 1212, 1214 and 1216 as part of an ERAM-aligned architecture. EPEs 1210, 1212, 1214, and 1216 are each a higher-level (less detailed) representation of the EPEs shown in FIG. 7. Each EPE comprises an ERAM sub-array 1220 made up of ERAM columns 1222 (note there may be more than one physical memory column per bit of output), memory I/O 1224 and a PPE 1226. EPEs 1210, 1212, 1214 and 1216 have outputs 1240, 1242, 1244 and 1246, respectively. A single shared row decoder and word driver unit 1250 is used to drive all four EPEs shown and thus drives multiple ERAM sub-arrays 1230. Although there are four (4) ERAM sub-arrays 1230 shown in FIG. 12, in practice there may be many more or less for each row decode and word driver unit 1250. The outputs 1260 from other PPEs are shown passing by the PPEs shown. There may also be other hardware shared in a group of EPEs. The sharing of hardware including the row decoder and driver unit 1250 in a group more efficiently utilizes the transistors on the display. The number of sub-arrays in a group will be a function of various design considerations for power, size, and speed.

Figure 13:
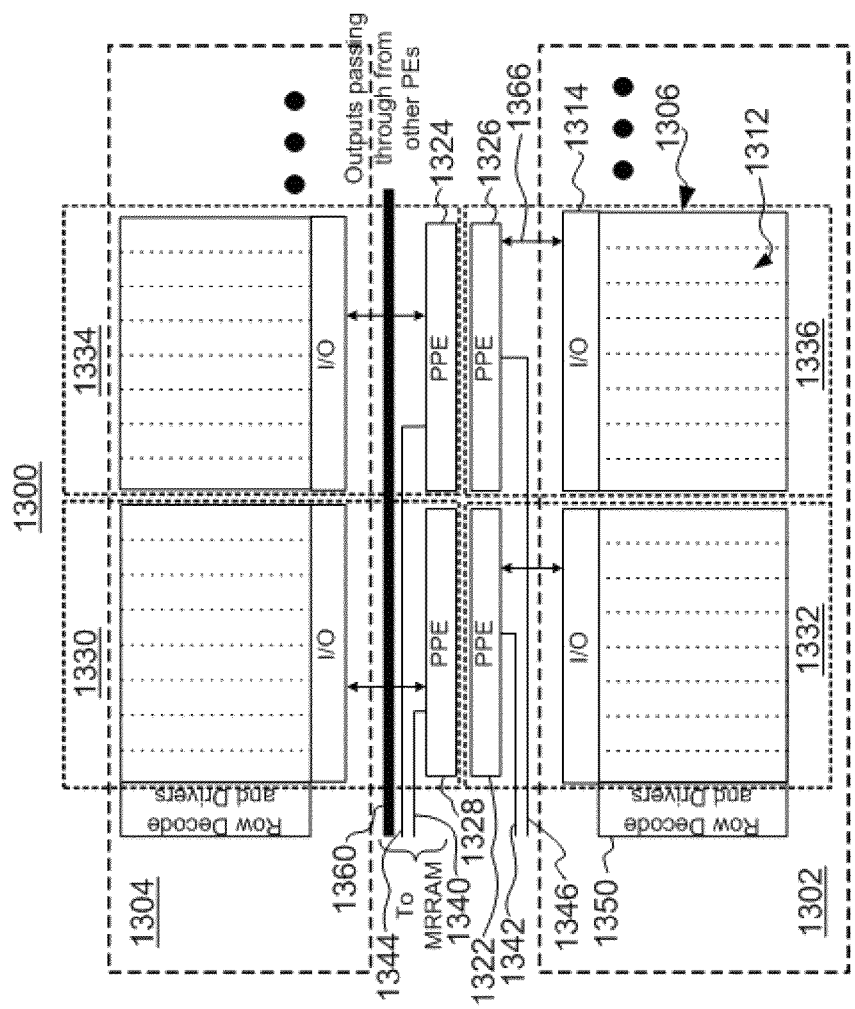
FIG. 13 is a diagram showing a "butterflied-ERAM-and-processors architecture" in accordance with one embodiment of the present invention.

FIG. 13 shows an alternative "butterflied-ERAM-and-processors architecture" configuration of EPEs 1300 similar to that of FIG. 12 but where the ERAM is "butterflied" or split into two banks 1302 and 1304, each with their ERAM sub-arrays 1306 comprising columns 1312 of memory bits and an I/O 1314 with parallel processing elements (PPE) 1322, 1324, 1326 and 1328 positioned between the two (2) banks of ERAM, i.e., banks 1302 and 1304. EPEs 1330, 1332, 1334 and 1336 have outputs 1340, 1342, 1344 and 1346, respectively. There is a shared row decoder and word driver unit 1350 for each bank 1302 and 1304. Outputs 1360 from other PPEs are shown passing by from other PPEs. The sharing of hardware including row decoder and driver unit 1350 in a group more efficiently utilizes the transistors on the display. While only four (4) PEs are shown in FIG. 13, the number of PEs and the amount of ERAM may be any number and amount, respectively.

The advantages of the butterfly arrangement of EPEs 1300 that splits the ERAM and puts the processors in the middle results in shorter columns 1312. With shorter columns, there are generally more physical columns of memory bits per bit of output. Shorter columns may provide faster access and lower power. In the configuration shown in FIG. 13, alternate PPEs 1326 are connected via data lines 1366 to I/O on alternate sides of the array, but other configurations are possible. For example, in FIG. 13, PPE 1326 may have access to the ERAM sub-arrays of both EPE 1336 and EPE 1334.

It should be noted in FIG. 12 and FIG. 13 how the PPE are shaped to the pitch/width of the ERAM sub-arrays. For purposes of the present invention, the phrase "PPEs pitch matched to the ERAM sub-arrays" indicates that the physical layout matches some set of PPEs to some set of ERAM sub-arrays. The key is that the shape of the ERAM drives how the processors/PPEs are positioned.

Figure 14:
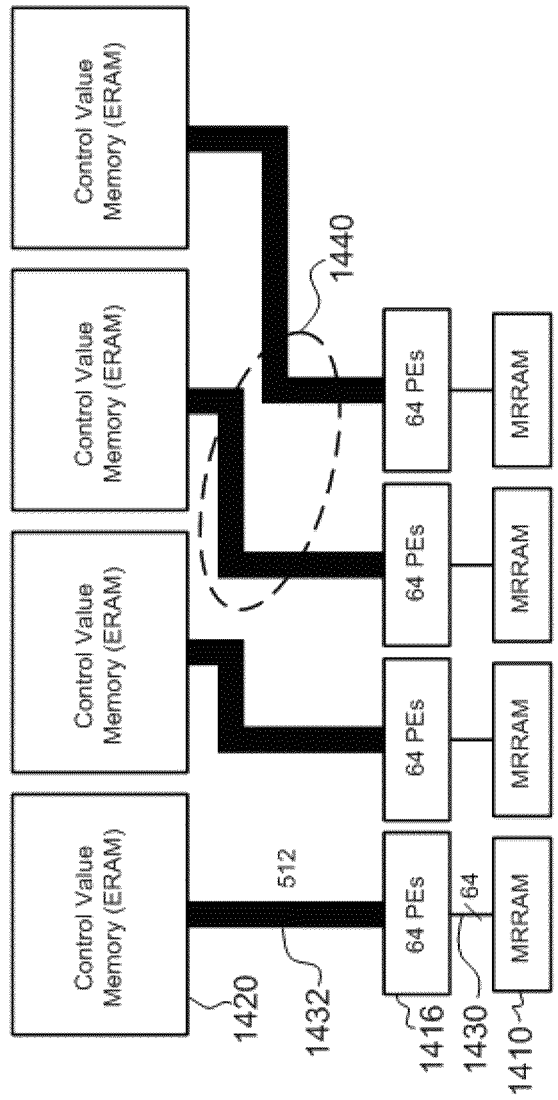
FIG. 14 is a diagram showing the prior art connection of ERAM and processing elements.

FIG. 14 shows a prior art configuration of MMRAM columns 1410 with multiple processing elements (PEs) 1416 and ERAM banks 1420. In this example, there are 64 8-bit-wide PEs with 64 outputs 1430 for driving 64 columns of MRRAM/pixels. Only 4 ERAM banks 1420 with four sets of 64 PEs 1416 are shown, whereas in an actual design there may be many more. There are 64×4=256 data lines 1432 between the 64 PEs 1416 and ERAM banks 1420.

In this case, the 64 PEs are pitch-matched to the 64 columns of MRRAM. The ERAM banks with 512 outputs as shown are not pitch-matched, which necessitates a wide routing channel with zig-zags 1440 in it that further increase the distance between the ERAM banks and the PEs. Because there are 512 lines between the ERAM banks and the 64 PEs there are potentially 512 lines moving up or down, and since the routing is inherently long, it uses a lot of power. While in theory the ERAM may be shaped to match the width of the MRRAM columns, this typically results in a less area and power efficient ERAM memory cell and memory array and forces the ERAM to be lined up with the display array.

Figure 15:
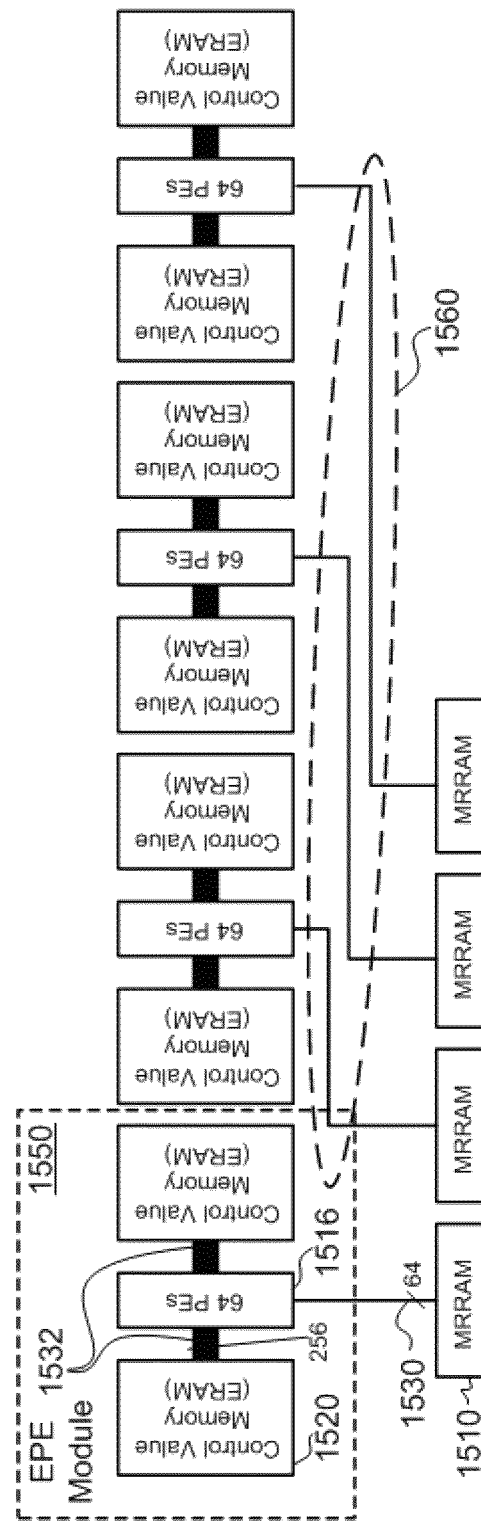
FIG. 15 is a diagram showing the connection of ERAM and processing modules in accordance with one embodiment of the present invention.

FIG. 15 shows a configuration according to some embodiments of the present invention. In this case, MRRAM 1510 is not pitch-matched to the 64 PEs 1516, and there are much longer MRRAM signal lines 1530 connecting PEs 1516 to MRRAM 1510. Instead, the 64 PEs 1516 are pitch-matched to the ERAM banks 1520 that are butterflied with PE 1516 as shown in more detail in FIG. 13. In this case, there are two smaller banks 1520 of ERAM with 256 outputs lines 1532 each feeding the 64 PEs. The combination of ERAMs and PEs are grouped together to form an EPE module, such as EPE module 1550. This configuration necessitates a much longer run from the PEs to the MRRAMs.

The configuration shown in FIG. 15 has a number of advantages over the prior art. The butterflying of the ERAM and PE configuration means that the ERAM columns are shorter and more power efficient. Since in this example, the PEs process 8 bits of ERAM for every one (1) bit of output, there are 8× fewer lines running the longer distance from the PEs to the MRRAM. PE to MRRAM signal lines 1530 will also include zig-zag routing 1560.

Whereas there can be about a 50% probability of the output lines 1532 changing between each time they send data to the PPEs, the PPEs outputs generally change much more rarely, often just once per edge in the pixel drive waveform (for example, as in FIG. 11). Assuming 256 possible edge times for say a simple 8-bit pixel control value, this means that there are many fewer transitions on the longer running lines 1530 compared to the shorter output lines 1532 that in turn can save considerable power on the microdisplay.

Figure 16:
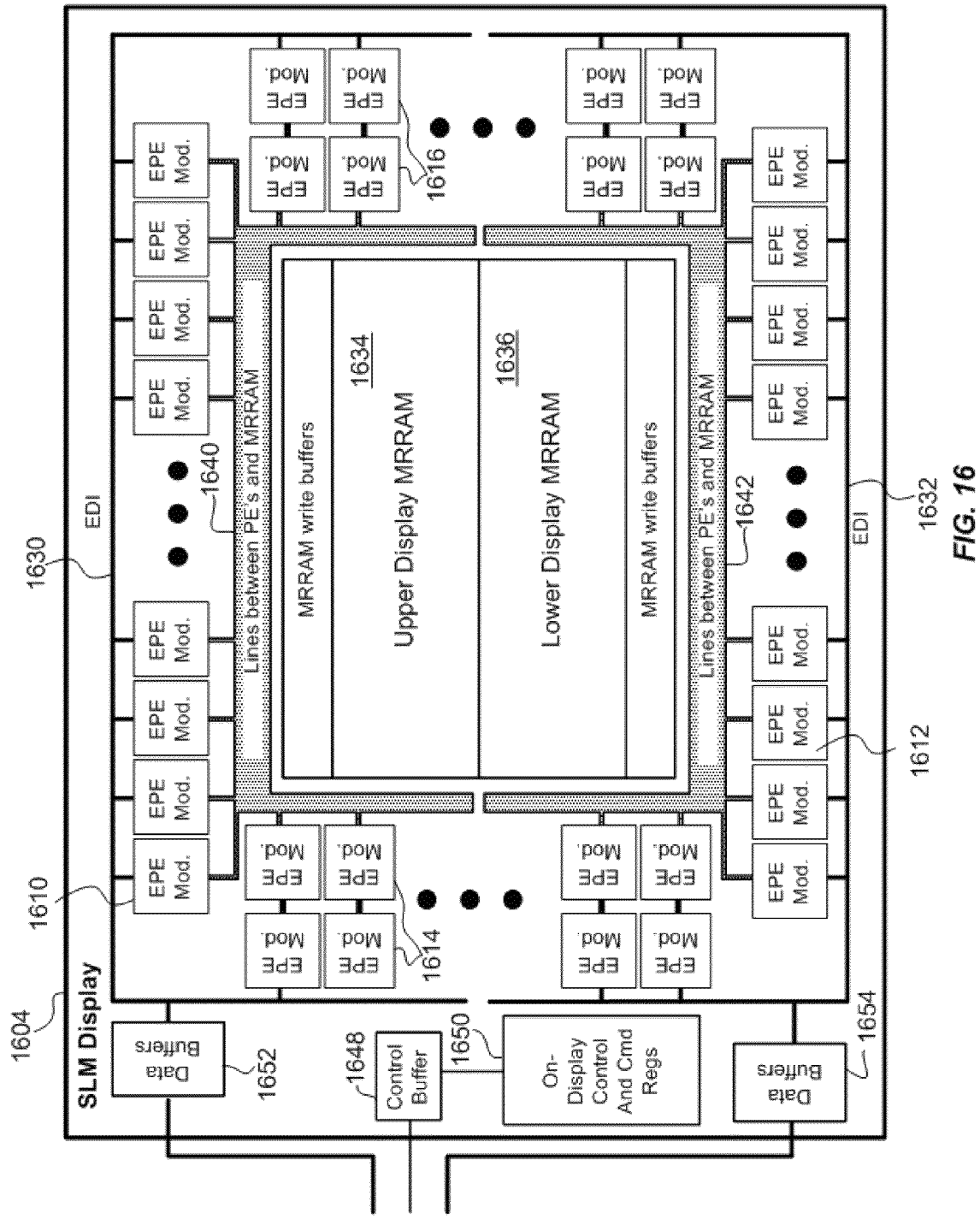
FIG. 16 is a diagram showing an SLM with EPE processing modules in accordance with one embodiment of the present invention.

FIG. 16 shows SLM 1604 which is similar to SLM 204 of FIG. 2. SLM 1604 has upper EPE modules 1610 and lower EPE modules 1612 on the top and bottom of, respectively of SLM 1604 and side EPE modules 1614 and side EPE modules 1616 on the left and right side of SLM 1604. Each EPE module 1610, 1612, 1614 and 1616 has many PEs and their associated ERAMs. EPE modules 1610, 1612, 1614 and 1616 are each similar to EPE module 1550 in FIG. 15. The number of PEs and the amount of associated ERAM per module could vary according to various design considerations. Multiple ERAM modules may be "stacked" on side EPE modules 1614 and 1616. Note that FIG. 16 is only figurative, as there will necessarily be many more EPE Modules in an actual device. For example, assuming there are 64 PPEs per EPE module, each PPE producing one (1) result per cycle, and there is a requirement to process one (1) line per cycle in both the top and bottom of the MRRAM, then the top-bottom split would have to be two (2) upper and lower EPE modules 1610 and 1612 for every 64 columns. So with all the previous assumptions, a 1920×1080 SLM would require 2×1920/64=60 modules. ERAM Data In 1630 and 1632 feed incoming ERAM data to the modules on the top and bottom, respectively. There are a fairly massive number of lines 1640 and 1642 that connect the EPE modules to the top MRRAM 1634 and bottom MRRAM 1636, respectively. There may be switches on lines 1640 and 1642 which enable different PPEs to connect to different columns of the MRRAM. SLM 1604 also includes a control buffer 1648, an on-display controller 1650 and data buffers 1652 and 1654 that function similarly to control buffer 248, on-display controller 250 and data buffers 252 and 254 of SLM 204. The other features of SLM 1604 also function similarly to comparable features of SLM 204.

In some applications, it is desirable to make the device as short as possible in one direction, as this can help make the end device thinner. These EPE modules can be placed essentially anywhere on the device, which means that smaller and/or fewer modules can be placed on the top and bottom of the SLM and more placed on the sides to help make the device less tall in one direction.

Figure 17:
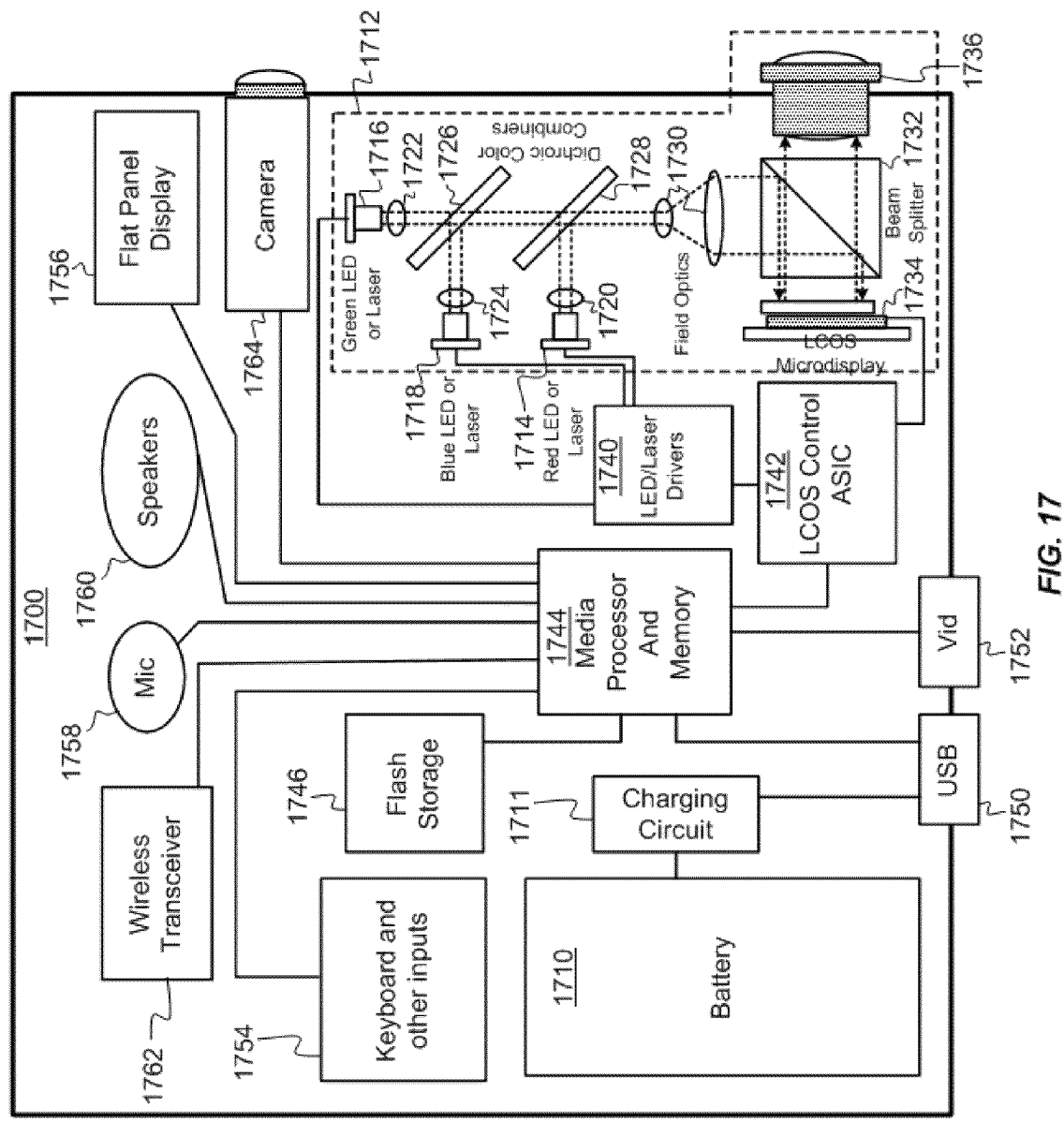
FIG. 17 is a system diagram showing the application of the SLM in accordance with some embodiments of the present invention.

FIG. 17 shows a block diagram of one way in which the concepts of the current invention may be used in a multimedia projection system 1700. In this example, system 1700 is powered by a battery 1710 with charging circuit 1711. The block diagram shows a generic optical engine 1712 for a microdisplay-based projector. Projection system 1700 includes a red light source 1714, green light source 1716 and a blue light source 1718. Each light source may be an LED or a laser. In a simple pure field sequential color system red light source 1714, green light source 1716, or blue light source 1718 is sequentially turned on, but it is also possible that two or all three of the light sources may be on at the same time for some mixed color, for multi-primary fields. Optical elements 1720, 1722, and 1724 are used to shape light from red light source 1714, green light source 1716, and blue light source 1718, respectively. It is also possible that colors other than red, green, and blue may be used for the light sources. Additionally, colors that are invisible to a human, such as infrared may be used for various applications, including putting out a "structured light" image to help with image recognition.

Although in FIG. 17 the combining of the red, green, and blue light is shown using simple dichroic filters 1726 and 1728, other methods may be used. In the case of lasers, there is generally some form of despeckling and beam-shaping optics, although this varies in each design and is not shown. In some designs, the light might also go through some "pre-polarization" optics (not shown). Next, the combined light goes into field optics 1730 that will shape the light for illuminating the microdisplay.

In the case of LCOS there is often a polarizing beam splitter 1732 that directs the polarized light from the lasers to the microdisplay 1734. Microdisplay 1734 is one example of a device that corresponds to SLM 204 of FIG. 2. Polarizing beam splitter 1732 reflects one polarization of light and passes the other polarization. Beam splitter 1732 has the effect of passing only highly polarized light to the LCOS microdisplay. Each pixel/mirror/electrode of the LCOS microdisplay controls the liquid crystal over that pixel to rotate the light for each pixel that is non-black, so that it will pass through the beam splitter after it reflects off a given pixel's mirror. The light out of the beam splitter then goes to a projection lens 1736 that then expands the resultant image for viewing. It should be understood that FIG. 17 is a simplified optical diagram, and there may be many different ways to implement a small optical engine.

LED or laser drivers 1740 provide the high-current electrical signals to the LED and are controlled by an ASIC 1742 that also controls the LCOS microdisplay. ASIC 1742 may have a frame buffer on the same silicon as ASIC 1742 itself, or the frame buffer may be part of a "system on package" (SOP), in which where more than one device in mounted in the same package. Media processor 1744 and memory device or subsystem is used to take various data types and convert them into images for display that it sends to LCOS control ASIC 1742. Flash storage 1746 is used to hold data and display content, which may include compressed or decompress still pictures and/or video, documents, presentation graphics material, or any other type of audio-visual material that may be presented using this device. Also shown is USB input 1750 that can be used both to charge the battery and download data and programs to media processor 1744. A video input 1752 can accept standard analog and digital, compressed or uncompressed video information that could go to media processor 1744. Keyboard or other inputs 1754 may be used for human inputs and control, and there may be any number of other inputs and outputs to the system, as are common on portable devices like cell phones, cameras, and media players today. In addition to the projector, there may be other display devices such as a small LCD flat panel 1756. Also shown in FIG. 17 is a wireless transceiver and, when combined with speakers and a microphone, the device may, among other applications, be used as a cell phone. In other applications, a camera may be included. Microphone 1758 may be used for voice or music input, and speakers 1760 may be used for audio playback or as part of a phone or the like. Wireless transceiver 1762 may be used to receive local input such as a remote control, and/or it may be used for wireless communication including cell phone and/or wireless Internet.

A camera 1764 may also be included that may work independently of or in conjunction with the projector. For example, camera 1764 or other visual input or distance-measuring device may be use to control a focus mechanism on the projector's output lens. Camera 1764 may be used as an input device to input hand and finger motions via image recognition by media processor 1744. Additionally, the camera could detect visible or human invisible images projected by optical engine 1712. There may be a position-sensitive sensor incorporated to detect movement and thereby affect the image that is projected.

There are many and various additions and changes that may be made to the system of FIG. 17. Additionally, some of the blocks shown in FIG. 17 may be combined or split apart in different implementations.

Figure 18:
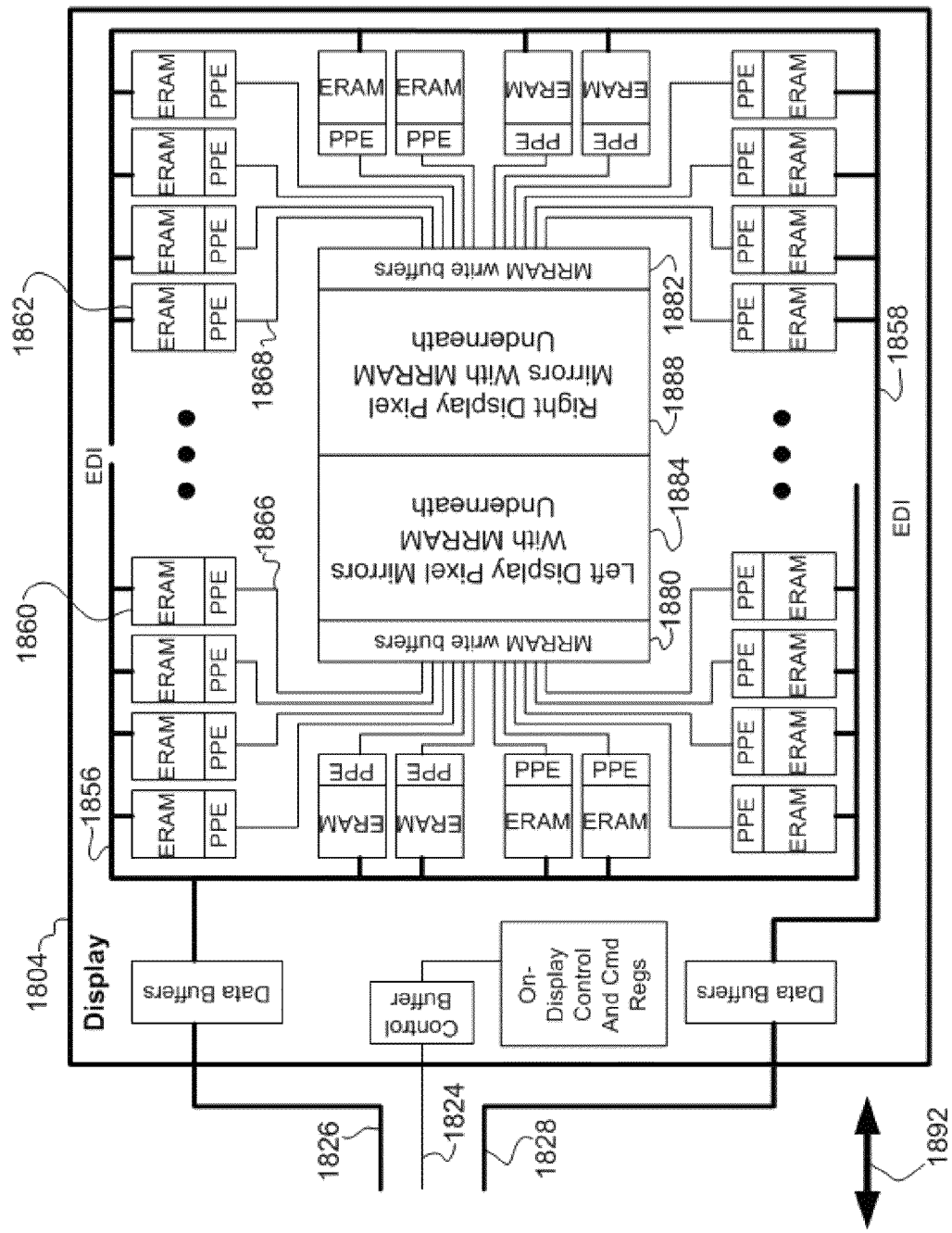
FIG. 18. is a block diagram showing an implementation of a display subsystem that includes a spatial light modulator (SLM) and a controller for the SLM in accordance with one embodiment of the present invention.

FIG. 18 shows an embodiment wherein the MRRAM array is split left and right rather than top and bottom as in FIG. 2. FIG. 18 shows an SLM 1804 with a control input 1824, a left data input 1826 and a right data input 1828 that go to buffers to drive the left ERAM data in lines 1856 and right ERAM data in lines 1858. There are sets of left ERAMs 1860 and right ERAMs 1862. Left ERAMs 1860 have MRRAM signal control lines 1866, and the right ERAMs 1862 have signal control lines 1868 that connect to MRRAM write buffers 1880 and 1882, respectively. Write buffers 1880 and 1882 in turn drive a left MRRAM array 1884 and a right MRRAM array 1888, respectively. In this arrangement, each match stage "rasters" in the horizontal direction indicated by arrow 1892.

Unless specified otherwise, the various digital components of the present invention may comprise hardware and/or software.

All documents, patents, journal articles and other materials cited in the present application are incorporated herein by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart there from.

What is claimed is:

1. A device comprising:
a spatial light modulator comprising a plurality of masking-processors,
wherein the plurality of masking processors comprise parallel processing elements (PPE) for computing a respective drive waveform for each pixel of a plurality of pixels on the spatial light modulator,
wherein each masking-processor comprises logic circuitry for logically and/or arithmetically comparing one or more multiple-bit pixel control values to one or more multiple-bit match values,
wherein the PPE are part of execution RAM (ERAM) and PPE processing (EPE) modules located on at least three sides of a mirror RAM (MRRAM) array of the spatial light modulator, and
wherein each EPE module comprises ERAM for the PPE of the EPE module.

2. The device of claim 1, wherein each masking-processor masks one or more bit positions when comparing one or more multiple-bit pixel control values to one or more multiple-bit match values for each pixel of the plurality of pixels.

3. The device of claim 1, wherein the device comprises a masking-loader for writing to storage one or more multiple-bit pixel control values when masked by each masking-processor.

4. The device of claim 1, wherein the masking-processor comprises one or more masking comparators.

5. The device of claim 1, wherein the EPE modules are located on four sides of the MRRAM array.

6. A device comprising:
a spatial light modulator comprising parallel processing elements (PPE) for computing a respective drive waveform for each respective pixel of a plurality of pixels on the spatial light modulator, and
a command sequencer for generating a sequence of one or more programmable match values,
wherein each parallel processing element of the parallel processing elements comprises logic circuitry for logically and/or arithmetically comparing one or more multiple-bit pixel control values for a respective pixel of the plurality of pixels to the one or more programmable match values for the respective pixel, and wherein the PPE are part of execution RAM (ERAM) and PPE processing (EPE) modules located on at least three sides of a mirror RAM (MRRAM) array of the spatial light modulator, and wherein each EPE module comprises ERAM for the PPE of the EPE module.

7. The device of claim 6, wherein each parallel processing element comprises masking-logic for ignoring one or more bits of the one or more multiple-bit pixel control values and/or the programmable match values when comparing the one or more multiple-bit pixel control values to the one or more programmable match values.

8. The device of claim 6, wherein the command sequencer generates the sequence of one or more multiple-bit match values based on one or more multiple-bit match values fetched from one or more memories of the device.

9. The device of claim 6, wherein the command sequencer comprises a function generator for generating the sequence of one or more multiple-bit match values.

10. The device of claim 6, wherein each parallel processing element comprises one or more masking comparators.

11. The device of claim 6, wherein the EPE modules are located on four sides of the MRRAM array.

12. A device comprising:
    a spatial light modulator comprising:
        parallel processing elements (PPE),
        a pixel control value storage, and
        a mirror RAM (MRRAM) array,
    wherein the PPE are part of execution RAM (ERAM) and PPE processing (EPE) modules located on at least three sides of the MRRAM array of the spatial light modulator, and
    wherein each EPE module comprises ERAM for the PPE of the EPE module.

13. The device of claim 12, wherein the ERAM-aligned architecture comprises a butterflied-ERAM-and-processors architecture.

14. The device of claim 12, wherein the EPE modules are located on four sides of the MRRAM array.

15. A method comprising the following steps:
    (a) controlling a pixel of a spatial light modulator based on a first multiple-bit pixel control value,
    (b) ignoring one or more first bits of the first multiple-bit pixel control value to thereby form one or more ignored bits, and
    (c) storing one or more second bits for a second multiple-bit pixel control value in respective storage locations of the one or more ignored bits,
    wherein the pixel of the spatial light modulator is controlled based on the second multiple-bit pixel control value,
    wherein steps (a) and (b) are conducted by parallel processing elements (PPE) of the spatial light modulator, and
    wherein the PPE are part of execution RAM (ERAM) and PPE processing (EPE) modules located on at least three sides of an mirror RAM (MRRAM) array of the spatial light modulator, and
    wherein each EPE module comprises ERAM for the PPE of the EPE module.

16. The method of claim 15, wherein the one or more first bits are used to control a first color of the pixel and wherein the one or more second bits are used to control a second color of the pixel.

17. The method of claim 15, comprising the following step:
    (d) storing the first multiple bit pixel control value on the spatial light modulator prior to step (a).

18. The device of claim 15, wherein the EPE modules are located on four sides of the MRRAM array.

* * * * *